United States Patent
Oosawa

(10) Patent No.: US 6,751,341 B2
(45) Date of Patent: Jun. 15, 2004

(54) IMAGE POSITION MATCHING METHOD AND APPARATUS

(75) Inventor: Akira Oosawa, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 589 days.

(21) Appl. No.: 09/853,659

(22) Filed: May 14, 2001

(65) Prior Publication Data

US 2001/0048758 A1 Dec. 6, 2001

(30) Foreign Application Priority Data

May 12, 2000 (JP) ........................................ 2000-140332
Apr. 4, 2001 (JP) ........................................ 2001-105537

(51) Int. Cl.$^7$ ................................................. G06K 9/00
(52) U.S. Cl. ..................... 382/132; 378/20; 378/98.11; 382/151; 382/209
(58) Field of Search ............................... 382/128, 129, 382/130, 131, 132, 133, 209, 215, 216, 217, 218, 219, 278, 294, 298, 299; 600/410, 414, 426, 443, 467, 529, 324; 250/310; 378/20, 170, 174, 98.11, 98.12

(56) References Cited

U.S. PATENT DOCUMENTS

| | | | |
|---|---|---|---|
| 5,359,513 A | | 10/1994 | Kano et al. ............ 364/413.23 |
| 5,982,915 A | * | 11/1999 | Doi et al. ..................... 382/130 |
| 6,317,510 B1 | * | 11/2001 | Murakami ................... 382/132 |
| 6,470,092 B1 | * | 10/2002 | Li et al. ...................... 382/132 |
| 6,563,942 B2 | * | 5/2003 | Takeo et al. ................ 382/132 |
| 6,563,943 B1 | * | 5/2003 | Sasada ........................ 382/132 |

FOREIGN PATENT DOCUMENTS

| | | | |
|---|---|---|---|
| JP | 7-37074 | 2/1995 | ............. G06T/1/00 |
| JP | 8-335721 | 12/1996 | ........... H01L/35/14 |

OTHER PUBLICATIONS

Abstract JP 8335721 A Dec. 17, 1996.

* cited by examiner

Primary Examiner—Jayanti K. Patel
Assistant Examiner—Abolfazl Tabatabai
(74) Attorney, Agent, or Firm—Sughrue Mion, PLLC

(57) ABSTRACT

Template regions and corresponding search regions are set in two images. In each search region, a subregion in which a degree of image pattern coincidence with the corresponding template region is high, is determined. A position relationship between each template region and the corresponding subregion is calculated. Operations are iterated, in which a size of the search region and/or a search range is reduced in stages, the template region and the search region are set in accordance with the position relationship having been calculated, and a position relationship between the template region and the corresponding subregion is calculated successively, an ultimate position relationship being thereby calculated. Image position matching is performed in accordance with the ultimate corresponding position relationship.

20 Claims, 16 Drawing Sheets

F I G. 16
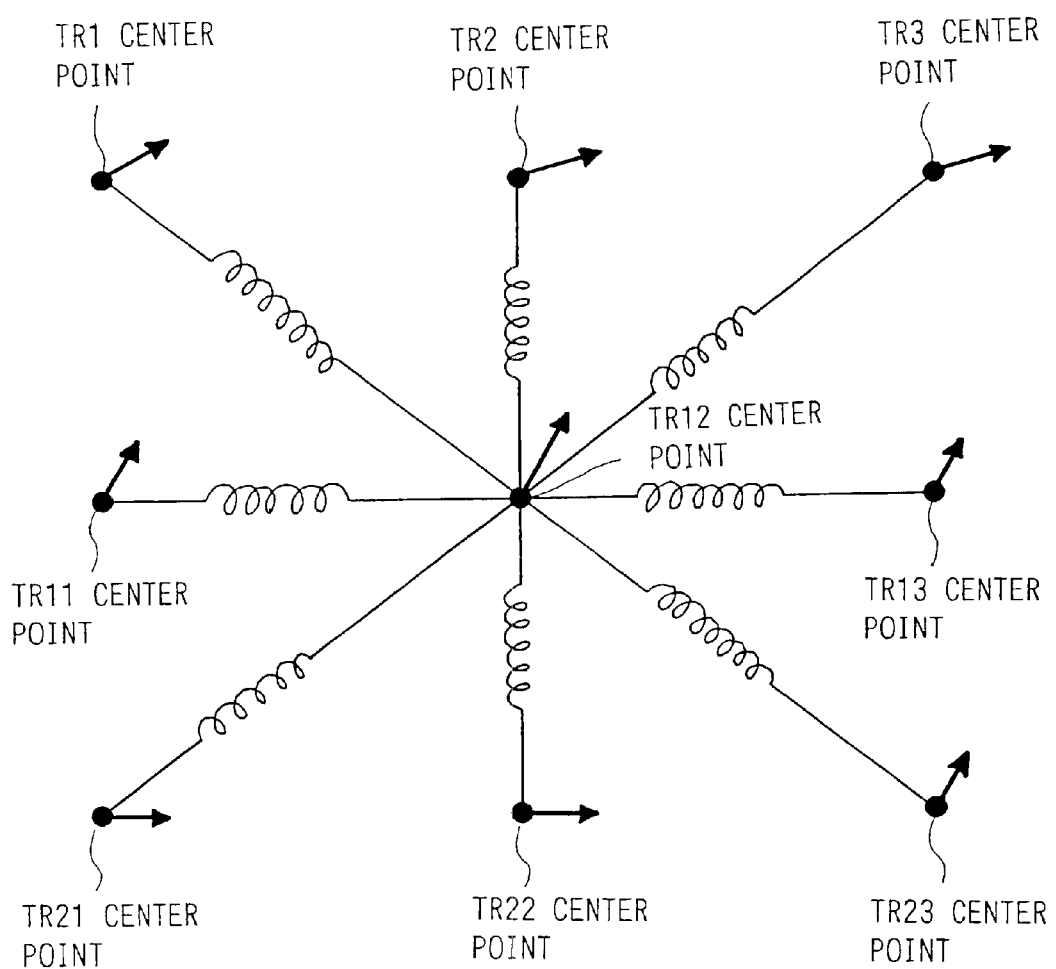

FIRST TEMPLATE REGIONS

FIRST SEARCH REGIONS

SECOND TEMPLATE REGIONS

SECOND SEARCH REGIONS

IMAGE POSITION MATCHING METHOD AND APPARATUS

BACKGROUND OF THE INVENTION

1. Field of the Invention

This invention relates to a method and apparatus for matching positions of images. This invention particularly relates to an improvement in position matching of two images of a single same object.

2. Description of the Related Art

Techniques for comparing at least two images of a single same object, finding a difference between the images, and making an examination of the object, or the like, in accordance with the difference between the images have heretofore been conducted in various fields.

For example, in the fields of production of industrial products, there have heretofore been conducted techniques for comparing an image of a certain product, which image has been recorded when the product is in a state of a new article, and an image of the product, which image has been recorded after a durability test has been made on the product, paying attention to part of the product, at which the difference between the images is large, and determining part of the product, at which the durability is to be enhanced. Also, in the medical fields, there have heretofore been conducted techniques for comparing a plurality of radiation images of a certain diseased part of a patient, which radiation images have been recorded in a time series mode, with one another, finding the condition of advance of the disease or the condition of cure of the disease, and determining a plan for treatment of the disease.

As described above, the techniques for comparing at least two images are conducted ordinarily in various fields. For making the comparison of the at least two images, the at least two images are often displayed on an image display device, and the like. Specifically, the images having been recorded are transformed into image density signals or luminance signals, and visible images are reproduced from the image density signals or luminance signals and displayed on the image display device, and the like. Alternatively, visible images are reproduced on a medium, such as film, by the utilization of a printer.

In cases where at least two images, which are to be compared with each other, are outputted, the images are ordinarily outputted so as to stand side by side with each other. In cases where the comparison is made, a matter of primary concern for the person, who sees the outputted images, is the difference between the images. However, it is not easy to find the difference between the images, which are merely located so as to stand side by side with each other. Particularly when the difference is small, it is difficult to find the difference in the manner described above. Therefore, there is a strong demand for enhancement of performance of the comparison.

Accordingly, ordinarily, techniques for performing inter-image operation processing, such as a subtraction process, on corresponding pixels in the at least two images to be compared with each other, and thereby extracting and enhancing the difference between the images are conducted. In cases where only the difference between the images is thus extracted and enhanced, the difference between the images is capable of being reliably perceived by the person, who sees the outputted image. As a result, the diseased part, which is advancing or curing, is capable of being found reliably.

In cases where the inter-image operation processing is to be performed, it is necessary that positions of the two images, which are to be subjected to the comparison, i.e. the inter-image operation processing, be accurately matched with each other. If the positions of the two images are not accurately matched with each other, an artifact of structures embedded in the images will occur from the inter-image operation processing, which is performed on the corresponding pixels in the images.

Besides the images having been recorded successively in the time series mode, two images, which have been acquired at two different points of time apart from each other, are often subjected to the comparison. In such cases, particularly, a shift often occurs between the two acquired images due to a deviation in orientation of the object during the image recording operation, error, and the like. Therefore, before the inter-image operation processing is performed, it is necessary for the shift to be compensated for.

Accordingly, techniques for matching positions of images have been proposed in, for example, Japanese Unexamined Patent Publication Nos. 7(1995)-37074 and 8(1996)-335721. The proposed techniques for matching positions of images comprise the steps of:

setting a plurality of template regions, which are small regions, in one of the two images of a single same object, which images are to be compared with each other, setting a plurality of search regions, each of which corresponds to one of the template regions having been set in the one image and is larger than each of the template regions, in the other image, determining a subregion in each of the search regions, in which subregion an image pattern approximately coincides with the image pattern within the corresponding template region, the determination being performed with respect to each of sets of the template regions and the corresponding search regions, and performing nonlinear strain transform processing (i.e., warping, e.g., nonlinear strain transform processing utilizing curve fitting with two-dimensional polynomials) on either one of the two images and in accordance with corresponding position relationships between the template regions in the one image and the subregions in the other image, such that the two regions approximately coincide with each other.

In the proposed techniques for matching positions of images, before the position matching processing described above (local position matching processing) is performed, a linear transform, such as an affine transform, comprising rotating processing and/or parallel translation, may be performed, and position matching may thereby be performed to a certain extent.

However, for example, in cases where image patterns of similar textures are embedded in adjacent local area limited regions as in the cases of rib image patterns in chest radiation images, even after the position matching processing described above has been performed, a shift often remains between certain local area limited regions.

Also, in cases where corresponding positions between the local area limited regions are to be determined, the accuracy of the position matching between the local area limited regions is capable of being enhanced by setting the size of each template region to be small. Therefore, the size of each template region should preferably be set to be as small as possible. However, if the small region is merely utilized for determining the subregion in a good position matching state (i.e., the optimum corresponding position), problems will often occur in that the highest degree of coincidence is obtained accidentally with respect to a subregion, which is not the correct optimum corresponding position, within the search region. In such cases, there is the risk that the image pattern within the local area limited region will distort unnaturally.

SUMMARY OF THE INVENTION

The primary object of the present invention is to provide a method of matching positions of images, wherein a shift between two images is capable of being suppressed more reliably than with conventional image position matching techniques and is capable of being eliminated accurately, such that an image obtained from position matching is prevented from becoming distorted unnaturally.

Another object of the present invention is to provide an apparatus for carrying out the method of matching positions of images.

A method and apparatus for matching positions of images in accordance with the present invention are characterized by successively reducing a size of a template region and/or a size of a corresponding search region in two images, successively calculating corresponding position relationships such that a degree of image pattern coincidence becomes high, calculating an ultimate corresponding position relationship in accordance with the respective corresponding position relationships, and position matching is performed in accordance with the ultimate corresponding position relationship, such that a shift between the two images is suppressed more reliably than with conventional image position matching techniques and is eliminated accurately, and such that an image obtained from the position matching is prevented from becoming distorted unnaturally.

Specifically, the present invention provides a method of matching positions of images, in which positions of two images of a single same object are matched with each other, the method comprising the steps of:

i) setting a plurality of template regions in one of the two images, ii) setting a plurality of search regions in the other image, each of which search regions corresponds to one of the template regions, iii) determining a subregion within each of the search regions, in which subregion a degree of image pattern coincidence with the corresponding template region is high, iv) calculating a corresponding position relationship between each of the template regions and the corresponding subregion, v) iterating operations, in which at least either one of a size of the search region and a size of a search range is reduced in stages, the template region and the search region are set in accordance with the corresponding position relationship having been calculated, and a corresponding position relationship between the template region and the corresponding subregion is calculated successively, an ultimate corresponding position relationship being thereby calculated, and vi) performing transform processing (e.g., nonlinear strain transform processing utilizing, for example, curve fitting with two-dimensional polynomials performed on an entire image area, or transform processing with linear interpolating operations with respect to each of local area limited regions) on at least either one of the two images and in accordance with the thus calculated ultimate corresponding position relationship, the positions of the two images being thereby matched with each other.

The term "search range" as used herein means the range, over which the template region is capable of moving within the search region. Specifically, for example, in cases where the template region and the search region have rectangular shapes, the size of the template region is represented by (Wt, Wt), and the size of the search region is represented by (Ws, Ws), the size of the search range may be represented by (Ws–Wt, Ws–Wt), where Ws≧Wt. More specifically, the term "reducing a size of a search range" as used herein means, for example, the cases where the size of the search region is kept unchanged and the size of the template region is set to be large, and the cases where the size of the template region is kept unchanged and the size of the template region is set to be small.

In the method of matching positions of images in accordance with the present invention, in cases where at least either one of the size of the search region and the size of the search range is reduced in stages, and the template region and the search region are set in accordance with the corresponding position relationship having been calculated, the size of the template region may also be reduced in stages. Specifically, the term "reducing at least either one of a size of a search region and a size of a search range in stages" as used herein means that, on the premise that at least either one of the size of the search region and the size of the search range is reduced in stages, the size of the template region may also be reduced in cases where at least either one of the size of the search region and the size of the search range is reduced in stages. The term does not contain the cases where the size of the template region alone is reduced.

Also, in the method of matching positions of images in accordance with the present invention, the object may be one of various objects, such as human bodies, animals, plants, industrial products, geographical features, celestial structures, and scenes. The two images, which are to be subjected to the position matching processing, object should preferably be the images subjected to inter-image operation processing, in which the position matching should be performed at a high accuracy. The inter-image operation processing should preferably be a subtraction process performed on corresponding pixels in the two images. In such cases, the subtraction process may be a simple subtraction or a weighted subtraction. An inter-image operation processed image, which has been obtained from the subtraction process, is ordinarily referred to as the subtraction image. By way of example, the subtraction image maybe an energy subtraction image obtained with the simple subtraction or the weighted subtraction performed on two original images, which have been formed with radiation having different energy distributions and approximately simultaneously in a time series mode (one of which is a high energy image having been formed with radiation having a high energy level, i.e. an ordinary radiation image, and the other of which is a low energy image having been formed with radiation having a low energy level, i.e. a high energy suppressed image). Alternatively, the subtraction image may be a temporal (time difference) subtraction image obtained from two original images, which have been recorded at two different points of time apart from each other in the time series mode. As another alternative, the subtraction image may be a digital subtraction angiography image obtained from two original images of blood vessels, which images have been recorded before injection of contrast media and after injection of the contrast media.

As described above, the two images of the single same object may be, for example, the two radiation images of an identical site of the single same object, which images have been recorded at two different points of time apart from each other in the time series mode. However, the two images of the single same object are not limited to the two radiation images described above, and the like. For example, the two images of the single same object may be two image areas, which are embedded in a single image and which represent sites having approximately identical shapes (e.g., the right and left lungs, or the right and left mammae). Specifically, the two images are not limited to two different images and may be two different image areas embedded in a single same image.

The two images described above should preferably be the medical radiation images.

The setting of the template regions and the corresponding search regions for the position matching processing may be performed over the entire areas of the two images to be subjected to the position matching processing. Alternatively, the setting of the template regions and the corresponding search regions for the position matching processing may be performed with respect to only the local area limited regions, between which there is a shift (a degree of shift is high).

In cases where the template regions and the corresponding search regions for the position matching processing are to be set with respect to only certain local area limited regions, the method of matching positions of images in accordance with the present invention may be modified such that local area limited regions, between which a degree of shift is high, in the two images are set (manually and arbitrarily) prior to the setting of the template regions and the corresponding search regions, and the template regions and the corresponding search regions are set with respect to only the local area limited regions, which have thus been set.

Alternatively, in cases where the template regions and the corresponding search regions for the position matching processing are to be set with respect to only certain local area limited regions, the method of matching positions of images in accordance with the present invention may be modified such that local area limited regions, between which a degree of shift is high, are selected (automatically) prior to the setting of the template regions and the corresponding search regions by (automatically) setting a plurality of local area limited regions in one of the two images (regardless of the degree of shift), setting a plurality of local area limited regions, each of which corresponds to one of the local area limited regions in the one image, in the other image (regardless of the degree of shift), calculating the degree of shift between corresponding local area limited regions in the two images and with respect to each of sets of the corresponding local area limited regions in the two images, and (automatically) selecting the local area limited regions, between which the degree of shift is high, in the two images in accordance with the thus calculated degrees of shift, and the template regions and the corresponding search regions are set with respect to only the local area limited regions, which have thus been selected.

The term "prior to setting of template regions and corresponding search regions" as used herein means every point of time, at which the template regions and the corresponding search regions are set in the two images. The term means the point of time, at which the template regions and the corresponding search regions are set originally, and each of the points of time, at which at least either one of the size of the search region and the size of the search range is reduced in stages, and the template region and the search region are set in accordance with the corresponding position relationship having been calculated. Specifically, the term "setting template regions and corresponding search regions with respect to only local area limited regions having been set (or selected)" as used herein means that the template regions and the corresponding search regions in accordance with the point of time, at which the setting of the local area limited regions has been performed, are set, and the operations are iterated, in which at least either one of the size of the search region and the size of the search range is reduced in stages in the local area limited regions, the template region and the search region are set in the local area limited regions and in accordance with the corresponding position relationship having been calculated, and a corresponding position relationship between the template region and the corresponding subregion is calculated successively. More specifically, for example, in cases where the local area limited regions have been set (or selected) prior to the setting of the template regions and the corresponding search regions in a second stage, the template regions and the corresponding search regions in the second stage are set with respect to only the local area limited regions having thus been set (or selected), and a corresponding position relationship between the template region and the corresponding subregion is calculated successively. In such cases, thereafter, the ultimate corresponding position relationship may be calculated with respect to only the local area limited regions having thus been set (or selected).

As a technique for automatically setting the local area limited regions over the entire areas of the two images and automatically selecting the local area limited regions, in which the template region and the corresponding search region are to be set, a technique may be employed, wherein the degree of shift between the corresponding local area limited regions is calculated as a total sum value of absolute values of pixel value differences between corresponding pixels in the corresponding local area limited regions in the two images, and the selection of the local area limited regions, between which the degree of shift is high, is made by performing threshold value processing on the total sum value of the absolute values of the pixel value differences between the corresponding pixels in the corresponding local area limited regions.

As the corresponding local area limited regions in the two images, regions having their centerpoints at identical spatial coordinates and having an identical shape (e.g., rectangular regions) in the two images may be employed.

In cases where the template regions and the corresponding search regions are capable of being set with respect to only the certain local area limited regions in the images in the manner described above, before the position matching processing with the method of matching positions of images in accordance with the present invention is performed, the technique for matching positions of images proposed in, for example, Japanese Unexamined Patent Publication No. 7(1995)-37074 or 8(1996)-335721, a linear transform, such as an affine transform, or the like, is capable of being performed as approximate position matching processing. Thereafter, the position matching processing with the method of matching positions of images in accordance with the present invention is capable of being performed as position re-matching processing in accordance with a shift between local area limited regions, for which the position matching could not be achieved appropriately with the approximate position matching processing.

Further, the method of matching positions of images in accordance with the present invention may be modified such that a first corresponding position relationship is calculated by:

setting a first template region in a local area limited region in one of the two images, the setting of the first template region being performed with respect to each of sets of corresponding local area limited regions in the two images, for which local area limited regions the determination of the subregion is to be performed, setting a first search region, which has a size larger than the size of the first template region, in the local area limited region in the other image, the setting of the first search region being performed with respect to each of the sets of the corresponding local area limited regions in the two images, for which local area limited regions the determination of the subregion is to be performed, determining a first subregion within the first search region, in which subregion the degree of image pattern coincidence with the first template region is high, the determination of the first subregion being performed with respect to each of sets of the first template regions and the corresponding first search regions within the corresponding local area limited regions in the two images, and calculating a corresponding position relationship between each of the first template regions and the corresponding first subregion as the first corresponding position relationship, a second corresponding position relationship is calculated by:

setting a second template region, which has a size smaller than the size of the first template region, in the local area limited region in the one image, the setting of the second template region being performed in accordance with the first corresponding position relationship and with respect to each of the sets of the corresponding local area limited regions in the two images, for which local area limited regions the determination of the subregion is to be performed, setting a second search region, which has a size larger than the size of the second template region and smaller than the size of the first search region, in the local area limited region in the other image, the setting of the second search region being performed with respect to each of the sets of the corresponding local area limited regions in the two images, for which local area limited regions the determination of the subregion is to be performed, determining a second subregion within the second search region, in which subregion the degree of image pattern coincidence with the second template region is high, the determination of the second subregion being performed with respect to each of sets of the second template regions and the corresponding second search regions within the corresponding local area limited regions in the two images, and calculating a corresponding position relationship between each of the second template regions and the corresponding second subregion as the second corresponding position relationship, an n-th corresponding position relationship ($n \geq 3$) is calculated by iterating the setting of template regions and search regions, the determination of subregions, and the calculation of corresponding position relationships, when necessary, the ultimate corresponding position relationship between each of the template regions and the corresponding subregion being thereby calculated, and the positions of the two images are matched with each other in accordance with the ultimate corresponding position relationship.

In such cases, at the stage, at which the second corresponding position relationship has been calculated, the ultimate corresponding position relationship between each of the template regions and the corresponding subregion may be calculated.

Also, in such cases, the degree of image pattern coincidence between the first template region and the first subregion should preferably be calculated in accordance with a normalized cross correlation value, and the degree of image pattern coincidence between the second template region and the second subregion, and the degree of image pattern coincidence between each of the template regions that follow and each of the corresponding subregions that follow should preferably be calculated in accordance with a total sum value of absolute values of pixel value differences between corresponding pixels in the template region and the corresponding subregion in the two images.

Alternatively, the degree of image pattern coincidence in every stage may be calculated in accordance with the normalized cross correlation value. As another alternative, the degree of image pattern coincidence in every stage may be calculated in accordance with the total sum value of the absolute values of the pixel value differences between the corresponding pixels in the template region and the corresponding subregion in the two images.

In the method of matching positions of images in accordance with the present invention and in an apparatus for matching positions of images in accordance with the present invention, which will be described later, a processing for matching the position of one of the two images with the position of the other image may be performed in accordance with the corresponding position relationship, which has been calculated, between adjacent stages associated with the operations, in which at least either one of the size of the search region and the size of the search range is reduced in stages, the template region and the search region are set in accordance with the corresponding position relationship having been calculated, and a corresponding position relationship between the template region and the corresponding subregion is calculated successively. Specifically, for example, in a stage between when the first corresponding position relationship has been calculated and when the second template region and the second search region are set, the processing for matching the position of one of the two images with the position of the other image may be performed in accordance with the first corresponding position relationship. (Also, in the same manner, in a stage between when the second corresponding position relationship has been calculated and when the third template region and the third search region are set, position matching may be performed on the two images, whose positions have been matched with each other in accordance with the first corresponding position relationship, and in accordance with the second corresponding position relationship. In this manner, before the template region and the search region are set in each stage, position matching may be performed in accordance with the corresponding position relationship, which has been calculated in the preceding stage.) In such cases, the ultimate corresponding position relationship is not an accumulated corresponding position relationship, which is obtained by accumulating the corresponding position relationships calculated in the respective stages. The n-th corresponding position relationship between the n-th subregion, which is determined in accordance with the n-th template region and the n-th search region having been set ultimately, and the n-th template region acts as the ultimate corresponding position relationship.

The present invention also provides a first apparatus for carrying out the method of matching positions of images in accordance with the present invention. Specifically, the present invention also provides an apparatus for matching positions of images, in which positions of two images of a single same object are matched with each other, the apparatus comprising:

position matching processing means for:
setting a plurality of template regions in one of the two images,
setting a plurality of search regions in the other image, each of which search regions corresponds to one of the template regions,
determining a subregion within each of the search regions, in which subregion a degree of image pattern coincidence with the corresponding template region is high,
calculating a corresponding position relationship between each of the template regions and the corresponding subregion,
iterating operations, in which at least either one of a size of the search region and a size of a search range is reduced in stages, the template region and the search region are set in accordance with the corresponding position relationship having been calculated, and a corresponding position relationship between the template region and the corresponding subregion is calculated successively, in order to calculate an ultimate corresponding position relationship, and
performing transform processing on at least either one of the two images and in accordance with the thus calculated ultimate corresponding position relationship in order to match the positions of the two images with each other.

As described above, the term "search range" as used herein means the range, over which the template region is capable of moving within the search region.

The present invention further provides a second apparatus for matching positions of images, in which positions of two images of a single same object are matched with each other, the apparatus comprising:

i) approximate position matching processing means for performing approximate position matching processing with respect to entire areas of the two images by performing transform processing comprising at least one kind of processing, which is among rotating processing, parallel translation, and image size enlargement or reduction processing, on the entire area of at least either one of the two images, and ii) position matching processing means for:
setting a plurality of template regions in one of the two images, whose positions have been approximately matched with each other by the approximate position matching processing means,
setting a plurality of search regions in the other image, each of which search regions corresponds to one of the template regions,
determining a subregion within each of the search regions, in which subregion a degree of image pattern coincidence with the corresponding template region is high,
calculating a corresponding position relationship between each of the template regions and the corresponding subregion,
iterating operations, in which at least either one of a size of the search region and a size of a search range is reduced in stages, the template region and the search region are set in accordance with the corresponding position relationship having been calculated, and a corresponding position relationship between the template region and the corresponding subregion is calculated successively, in order to calculate an ultimate corresponding position relationship, and
performing transform processing on at least either one of the two images and in accordance with the thus calculated ultimate corresponding position relationship in order to match the positions of the two images with each other.

The first and second apparatuses for matching positions of images in accordance with the present invention may be modified such that, in cases where the position matching processing means reduces at least either one of the size of the search region and the size of the search range in stages and sets the template region and the search region in accordance with the corresponding position relationship having been calculated, the position matching processing means also reduces the size of the template region in stages.

The setting of the template regions and the corresponding search regions by the position matching processing means may be performed over the entire areas of the two images to be subjected to the position matching processing. Alternatively, the setting of the template regions and the corresponding search regions by the position matching processing means may be performed with respect to only the local area limited regions, between which there is a shift (the degree of shift is high). Specifically, in cases where the setting of the template regions and the corresponding search regions by the position matching processing means is to be performed with respect to only certain local area limited regions, each of the first and second apparatuses for matching positions of images in accordance with the present invention may be modified such that the apparatus further comprises position matching region setting means for (manually and arbitrarily) setting local area limited regions, between which a degree of shift is high, in the two images prior to the setting of the template regions and the corresponding search regions, and the position matching processing means sets the template regions and the corresponding search regions with respect to only the local area limited regions, which have been set by the position matching region setting means, and calculates the ultimate corresponding position relationship.

Alternatively, in cases where the setting of the template regions and the corresponding search regions by the position matching processing means is to be performed with respect to only certain local area limited regions, each of the first and second apparatuses for matching positions of images in accordance with the present invention may be modified such that the apparatus further comprises position matching region selecting means for (automatically) selecting local area limited regions, between which a degree of shift is high, prior to the setting of the template regions and the corresponding search regions by (automatically) setting a plurality of local area limited regions in one of the two images (regardless of the degree of shift), setting a plurality of local area limited regions, each of which corresponds to one of the local area limited regions in the one image, in the other image (regardless of the degree of shift), calculating the degree of shift between corresponding local area limited regions in the two images and with respect to each of sets of the corresponding local area limited regions in the two images, and (automatically) selecting the local area limited regions, between which the degree of shift is high, in the two images in accordance with the thus calculated degrees of shift, and the position matching processing means sets the template regions and the corresponding search regions with respect to only the local area limited regions, which have been selected by the position matching region selecting means, and calculates the ultimate corresponding position relationship.

As described above, the term "prior to setting of template regions and corresponding search regions" as used herein means every point of time, at which the template regions and the corresponding search regions are set in the two images The term "setting template regions and corresponding search regions with respect to only local area limited regions having been set (or selected)" as used herein means that the template regions and the corresponding search regions in accordance with the point of time, at which the setting of the local area limited regions has been performed, are set, and the operations are iterated, in which at least either one of the size of the search region and the size of the search range is reduced in stages in the local area limited regions, the template region and the search region are set in the local area limited regions and in accordance with the corresponding position relationship having been calculated, and a corresponding position relationship between the template region and the corresponding subregion is calculated successively.

In the position matching region selecting means, as a technique for automatically setting the local area limited regions over the entire areas of the two images and automatically selecting the local area limited regions, in which the template region and the corresponding search region are to be set, a technique may be employed, wherein the degree of shift between the corresponding local area limited regions is calculated as a total sum value of absolute values of pixel value differences between corresponding pixels in the corresponding local area limited regions in the two images, and the selection of the local area limited regions, between which the degree of shift is high, is made by performing threshold value processing on the total sum value of the absolute values of the pixel value differences between the corresponding pixels in the corresponding local area limited regions.

In cases where the template regions and the corresponding search regions are capable of being set with respect to only the certain local area limited regions in the images in the manner described above, each of the first and second apparatuses for matching positions of images in accordance with the present invention may further comprise pre-processing means for performing the technique for matching positions of images proposed in, for example, Japanese Unexamined Patent Publication No. 7(1995)-37074 or 8(1996)-335721, a linear transform, such as an affine transform, or the like, as approximate position matching processing, or the like, before the position matching processing with the position matching processing means of the apparatus for matching positions of images in accordance with the present invention is performed. Thereafter, the position matching processing with the position matching processing means of the apparatus for matching positions of images in accordance with the present invention is capable of being performed as position re-matching processing in accordance with a shift between local area limited regions, for which the position matching could not be achieved appropriately with the approximate position matching processing performed by the pre-processing means. In this manner, the position matching is capable of being performed more accurately.

Further, each of the first and second apparatuses for matching positions of images in accordance with the present invention may be modified such that the position matching processing means comprises spring constraint processing means for performing spring constraint processing in at least one stage among the stages of setting the template region and the search region, the spring constraint processing comprising:

taking every template region in one of the two images and the corresponding subregion in the other image as center regions, taking a plurality of template regions, which surround the center region in the one image, and a plurality of the subregions, which surround the center region in the other image and correspond to the plurality of the template regions, as surrounding regions, constraining the corresponding position relationship, which has been calculated with respect to the corresponding center regions in the two images, and each of the corresponding position relationships, which have been calculated with respect to sets of corresponding surrounding regions in the two images, with each other, the constraint being performed with constraining forces in accordance with the corresponding position relationship, which has been calculated with respect to the corresponding center regions in the two images, and the corresponding position relationships, which have been calculated with respect to the sets of the corresponding surrounding regions in the two images, and calculating a new relative corresponding position relationship with respect to the center regions in accordance with the constraining forces, and the position matching processing means utilizes the new relative corresponding position relationship, which has been calculated by the spring constraint processing means and with respect to each of sets of the center regions in the two images, as the corresponding position relationship between the template region and the corresponding subregion in the at least one stage.

The term "stages of setting a template region and a search region" as used herein means the stages of reducing at least either one of the size of the search region and the size of the search range in stages and setting the template region and the search region, and the original stage of setting the template region and the search region.

Furthermore, each of the first and second apparatuses for matching positions of images in accordance with the present invention may be modified such that the position matching processing means is means for:

calculating a first corresponding position relationship by:
        setting a first template region in a local area limited region in one of the two images, the setting of the first template region being performed with respect to each of sets of corresponding local area limited regions in the two images, for which local area limited regions the determination of the subregion is to be performed, setting a first search region, which has a size larger than the size of the first template region, in the local area limited region in the other image, the setting of the first search region being performed with respect to each of the sets of the corresponding local area limited regions in the two images, for which local area limited regions the determination of the subregion is to be performed, determining a first subregion within the first search region, in which subregion the degree of image pattern coincidence with the first template region is high, the determination of the first subregion being performed with respect to each of sets of the first template regions and the corresponding first search regions within the corresponding local area limited regions in the two images, and calculating a corresponding position relationship between each of the first template regions and the corresponding first subregion as the first corresponding position relationship, calculating a second corresponding position relationship by:

setting a second template region, which has a size smaller than the size of the first template region, in the local area limited region in the one image, the setting of the second template region being performed in accordance with the first corresponding position relationship and with respect to each of the sets of the corresponding local area limited regions in the two images, for which local area limited regions the determination of the subregion is to be performed, setting a second search region, which has a size larger than the size of the second template region and smaller than the size of the first search region, in the local area limited region in the other image, the setting of the second search region being performed with respect to each of the sets of the corresponding local area limited regions in the two images, for which local area limited regions the determination of the subregion is to be performed, determining a second subregion within the second search region, in which subregion the degree of image pattern coincidence with the second template region is high, the determination of the second subregion being performed with respect to each of sets of the second template regions and the corresponding second search regions within the corresponding local area limited regions in the two images, and calculating a corresponding position relationship between each of the second template regions and the corresponding second subregion as the second corresponding position relationship, calculating an n-th corresponding position relationship by iterating the setting of template regions and search regions, the determination of subregions, and the calculation of corresponding position relationships, when necessary, in order to calculate the ultimate corresponding position relationship between each of the template regions and the corresponding subregion, and matching the positions of the two images with each other in accordance with the ultimate corresponding position relationship.

In such cases, the position matching processing means should preferably operate such that the degree of image pattern coincidence between the first template region and the first subregion is calculated in accordance with a normalized cross correlation value, and the degree of image pattern coincidence between the second template region and the second subregion, and the degree of image pattern coincidence between each of the template regions that follow and each of the corresponding subregions that follow are calculated in accordance with a total sum value of absolute values of pixel value differences between corresponding pixels in the template region and the corresponding subregion in the two images.

Alternatively, the degree of image pattern coincidence in every stage may be calculated in accordance with the normalized cross correlation value. As another alternative, the degree of image pattern coincidence in every stage may be calculated in accordance with the total sum value of the absolute values of the pixel value differences between the corresponding pixels in the template region and the corresponding subregion in the two images.

In the aforesaid processing for reducing at least either one of the size of the search region and the size of the search range in stages and calculating the ultimate corresponding position relationship, in cases where an (n+1)-th template region and an (n+1)-th search region are to be set in accordance with the n-th corresponding position relationship, the same number of the (n+1)-th template regions as the number of the n-th template regions, which have already been set, may be set at the positions approximately identical with the positions of the n-th template regions, and the same number of the (n+1)-th search regions as the number of the n-th search regions, which have already been set, may be set at the positions approximately identical with the positions of the n-th search regions. Alternatively, a number of the (n+1)-th template regions larger than the number of the n-th template regions, which have already been set, and a number of the (n+1)-th search regions larger than the number of the n-th search regions, which have already been set, may be set.

With the method and apparatuses for matching positions of images in accordance with the present invention, with respect to the two images to be subjected to the position matching processing, at least either one of the size of the template region and the size of the corresponding search region in the two images is reduced successively, and the template region and the corresponding search region are set successively in accordance with the corresponding position relationship, which has been calculated. Also, the corresponding position relationships are calculated successively such that the degree of image pattern coincidence becomes high, and the position matching is performed in accordance with the ultimate corresponding position relationship, which is calculated ultimately. Therefore, the shift between the two images is capable of being suppressed more reliably than with the conventional image position matching techniques and is capable of being eliminated accurately. Also, the image obtained from the position matching is capable of being prevented from becoming distorted unnaturally.

Specifically, with the method and apparatuses for matching positions of images in accordance with the present invention, at least either one of the size of the template region and the size of the corresponding search region in the two images is reduced successively, and the template region and the corresponding search region are set successively in accordance with the corresponding position relationship, which has been calculated. Therefore, the ranges of the regions, whose positions are to be matched with each other, become small in stages. As a result, the accuracy, with which the positions of the corresponding local area limited regions in the two images are matched with each other, is capable of being enhanced.

In such cases, in order for the position matching accuracy to be enhanced, the sizes of the regions (i.e., the template region and the search region) utilized for calculating the corresponding positions should preferably be as small as possible. However, if the small regions are merely utilized for calculating the corresponding positions in a good position matching state (i.e., the optimum corresponding positions), a local minimum phenomenon, wherein the highest degree of coincidence is obtained with respect to a subregion, which is not the correct optimum corresponding position, within the search region, will often occur. In such cases, the problems will occur in that the optimum corresponding position, which is calculated for each of the local area limited regions, becomes a position which is capable of being obtained only when the local area limited region is translated in a direction markedly different from the direction of translation of an adjacent local area limited region. As a result, the image pattern within the local area limited region will distort unnaturally.

Therefore, with the method and apparatuses for matching positions of images in accordance with the present invention, as described above, in order for the optimum corresponding positions to be calculated, the corresponding position relationships are calculated in stages by reducing the sizes of the regions in stages. Accordingly, the local minimum phenomenon is capable of being prevented from occurring, and the image pattern within the local area limited region is capable of being prevented from distorting unnaturally.

With the apparatuses for matching positions of images in accordance with the present invention, wherein the position matching processing means comprises the spring constraint processing means, the corresponding position relationship between the corresponding regions in the two images is smoothed in accordance with the corresponding position relationships, which have been calculated with respect to the sets of the surrounding regions. Therefore, the position matching accuracy is capable of being enhanced even further.

BRIEF DESCRIPTION OF THE DRAWINGS

FIG. 16 is a conceptual view showing how a shift vector of a template region acting as a center region and shift vectors of surrounding template regions are constrained with one another by virtual springs.

DESCRIPTION OF THE PREFERRED EMBODIMENTS

The present invention will hereinbelow be described in further detail with reference to the accompanying drawings.

Figure 1:
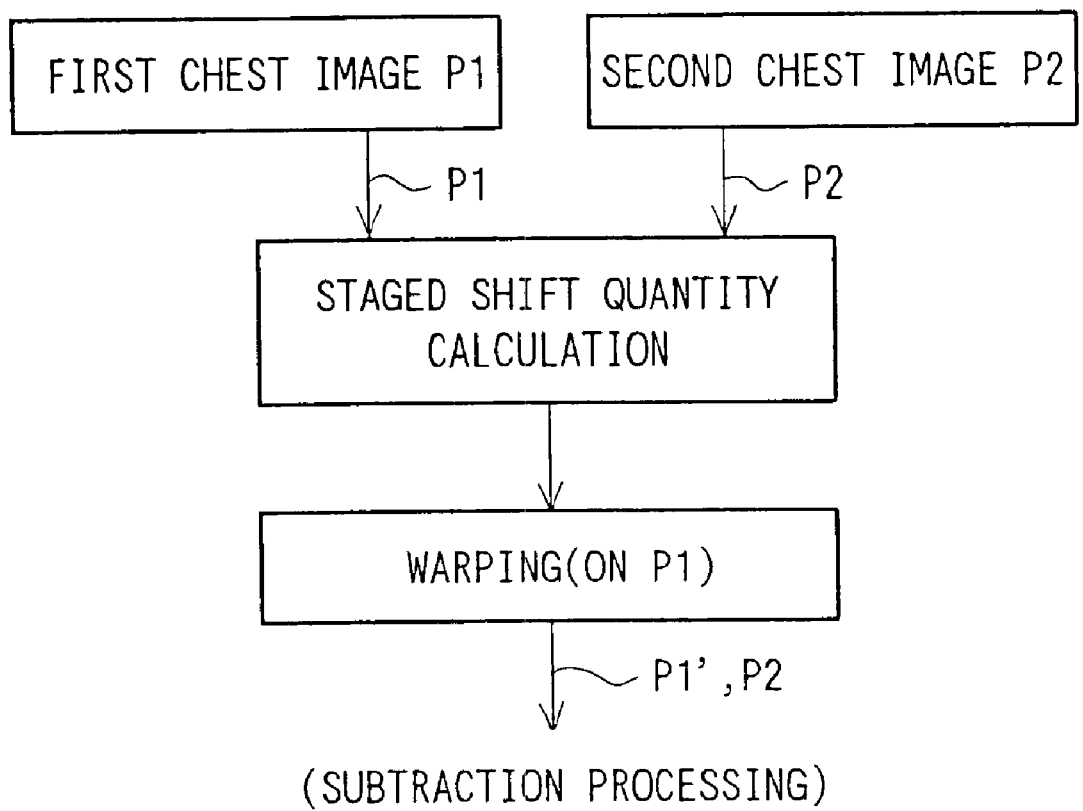
FIG. 1 is a flow chart showing a processing flow in an embodiment of the method of matching positions of images in accordance with the present invention.
Figure 2:
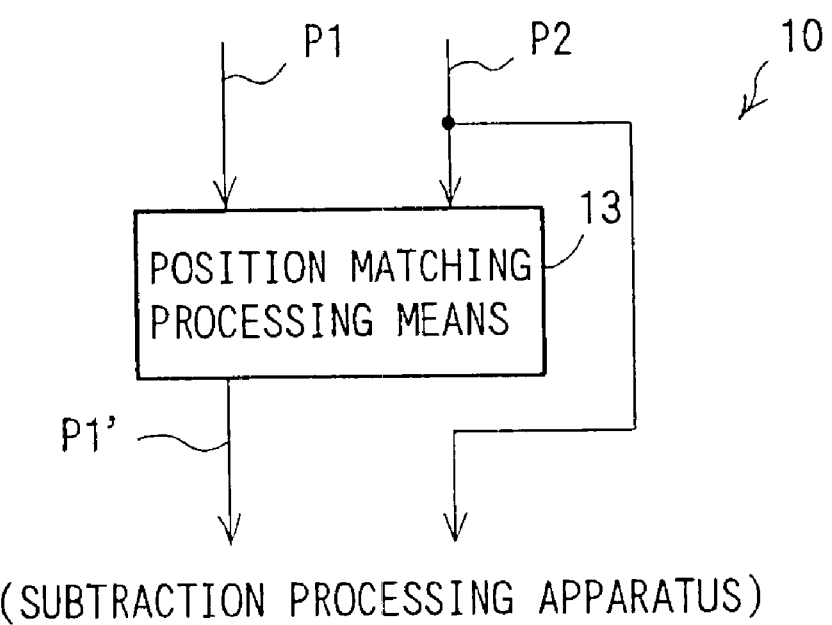
FIG. 2 is a block diagram showing a first embodiment of the apparatus for matching positions of images in accordance with the present invention, which carries out the processing flow shown in FIG. 1, FIGS. 3A and 3B are schematic views showing two images P1 and P2, whose positions are to be matched with each other by the first embodiment of FIG. 2.
Figure 3A:
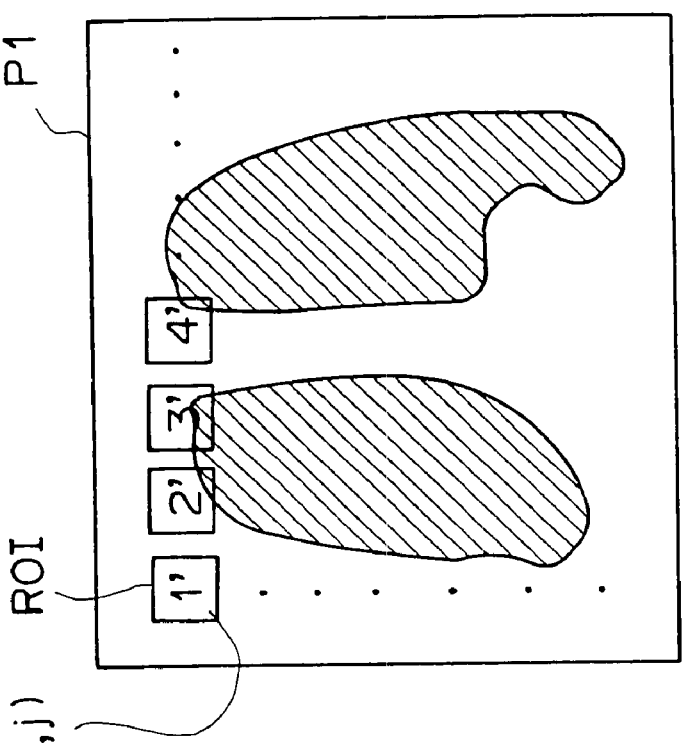
Figure 3B:
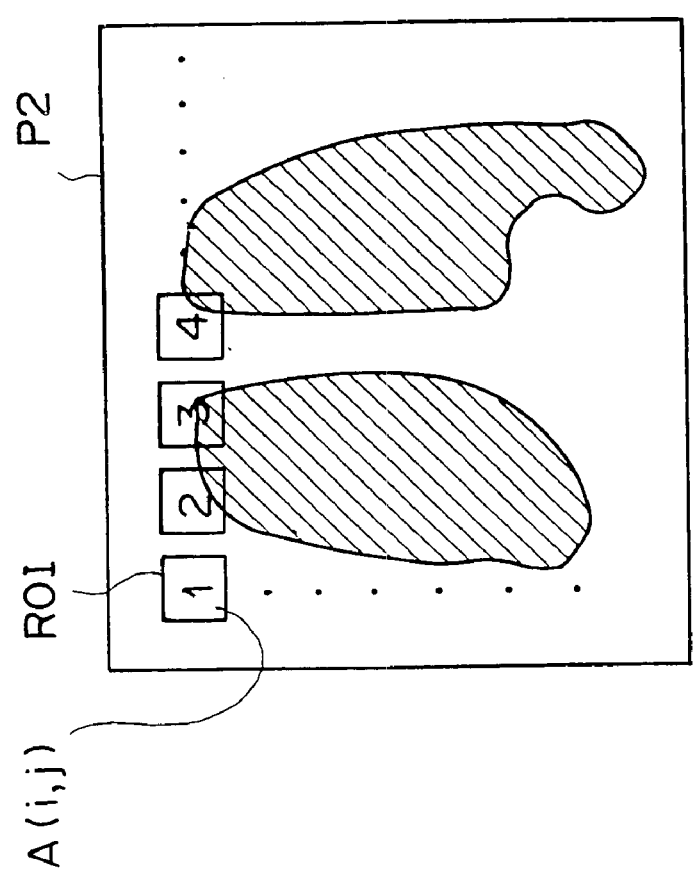

FIG. 1 is a flow chart showing a processing flow in an embodiment of the method of matching positions of images in accordance with the present invention. FIG. 2 is a block diagram showing a first embodiment of the apparatus for matching positions of images in accordance with the present invention, which carries out the processing flow shown in FIG. 1. FIGS. 3A and 3B are schematic views showing two images P1 and P2, whose positions are to be matched with each other by the first embodiment of FIG. 2. A first image P1 and a second image P2 are chest images (radiation images) of a single same patient, which images have been recorded at different points of time. The first image P1 is a past image, which has been recorded at a point of time earlier than the recording of the second image P2 in a time series mode. The second image P2 is a current image, which is newer than the first image P1.

In cases where the two images P1 and P2 are compared with each other, ordinarily, the person who sees the images, such as a medical doctor, makes a comparison by taking the second image P2, which is the current image, as a reference image. Therefore, in this embodiment of the apparatus for matching positions of images in accordance with the present invention, the second image P2 is taken as the reference image. However, alternatively, the first image P1 may be taken as the reference image, and the first image P1 and the second image P2 may be replaced by each other in the explanations described below.

With reference to FIG. 2, an image position matching apparatus 10 comprises position matching processing means 13. The position matching processing means 13 sets corresponding regions of interest (ROI's), which act as local area limited regions, in the first image P1 and the second image P2 of the single same object. The ROI's are set over the entire areas of the two images P1 and P2. Also, the position matching processing means 13 sets a template region (i.e., a template ROI) in one of the corresponding ROI's. Further, the position matching processing means 13 sets a search region (i.e., a search ROI) in the other ROI. The setting of the template region and the search region is performed with respect to each of the sets of the corresponding ROI's. Furthermore, the position matching processing means 13 determines a subregion within the search region, in which subregion the degree of image pattern coincidence with the corresponding template region is high. Also, the position matching processing means 13 calculates a corresponding position relationship (i.e., a shift quantity) between the template region and the corresponding subregion. Thereafter, the position matching processing means 13 iterates operations, in which the sizes of the template region and the search region are reduced in stages, the template region and the search region having the sizes reduced in stages are set in accordance with the corresponding position relationship having been calculated in the preceding stage, and a corresponding position relationship between the template region and the corresponding subregion is calculated successively. In this manner, the position matching processing means 13 calculates an ultimate corresponding position relationship with respect to each of the sets of the corresponding ROI's. (In this embodiment, an accumulated corresponding position relationship, which is obtained by accumulating the corresponding position relationships, i.e. the shift quantities, at the respective stages, is employed as the ultimate corresponding position relationship.) In accordance with the ultimate corresponding position relationships, which have been calculated ultimately with respect to the sets of the corresponding ROI's, the position matching processing means 13 performs nonlinear strain transform processing on the first image P1, such that every set of the corresponding local area limited regions in the two images P1 and P2 may approximately coincide with each other.

Figure 4:
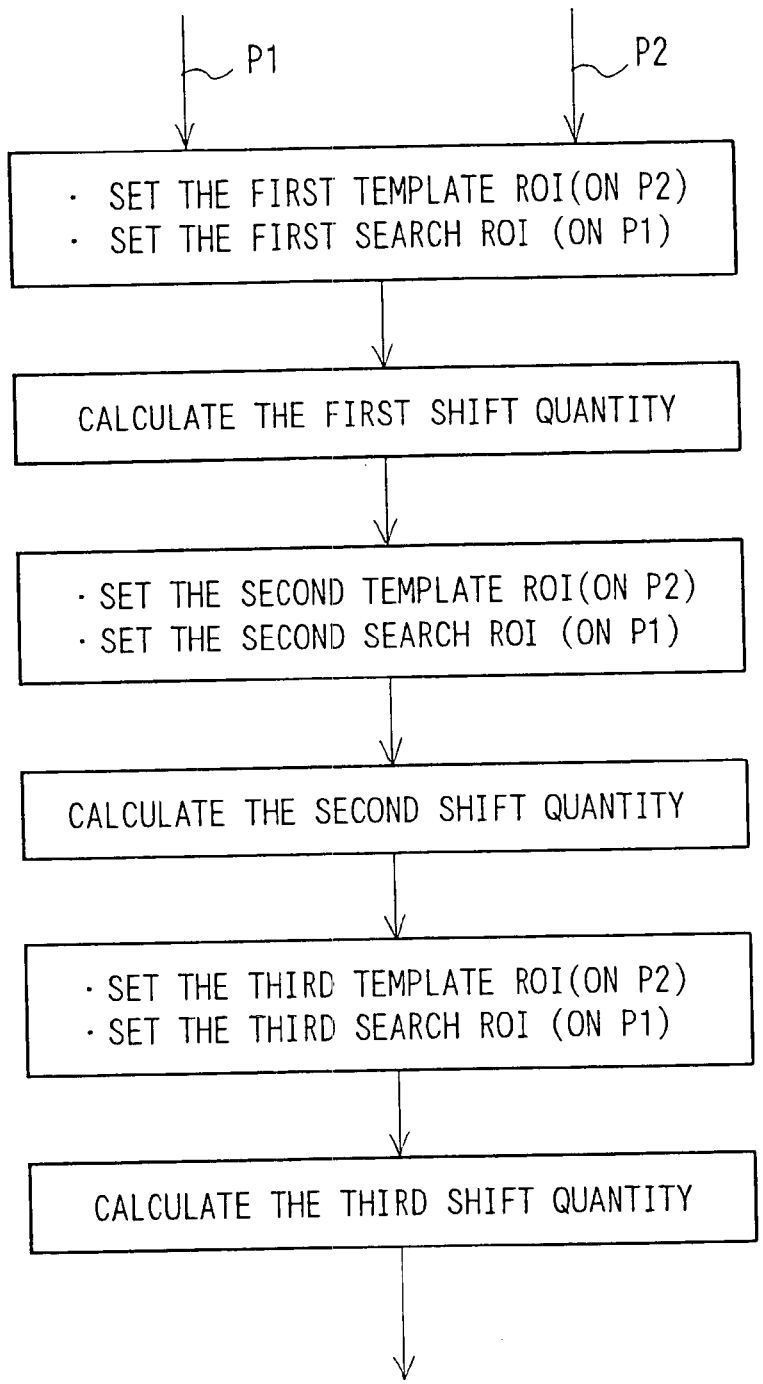
FIG. 4 is a detailed flow chart showing part of the processing flow shown in FIG. 1, FIGS. 5A and 5B are explanatory views showing correspondence relationships among a first template region TR2, a first search region RR2, and a first subregion tR2.

As illustrated in FIGS. 3A and 3B, the position matching processing means 13 sets a plurality of ROI's on each of the first image P1 and the second image P2. The ROI's have their center points at corresponding spatial coordinates on the first image P1 and the second image P2 and have an identical shape, e.g. a rectangular shape having a size of 16 pixels (in the vertical direction)×16 pixels (in the horizontal direction). Specifically, ROI1, ROI2, ROI3, ... are set in the second image P2, and ROI1', ROI2', ROI3', ... are set in the first image P1. Also, as illustrated in FIG. 4, the position matching processing means 13 performs the processing described below.

(1) As for the second image P2 acting as the reference image, with respect to each ROI in the second image P2, the position matching processing means 13 sets a first template region TR (one of TR1, TR2, ... ), which has its center point at a center point having coordinates (x0, y0) in the ROI. By way of example, the first template region TR may have a rectangular shape having a size of 80 pixels (in the vertical direction)×80 pixels (in the horizontal direction). Also, as for the first image P1, with respect to each ROI in the first image P1, the position matching processing means 13 sets a first search region RR (one of RR1, RR2, ... ), which has its center point at the same coordinates (x0, y0) as the coordinates of the centerpoint of the first template region TR and is larger than the first template region TR. By way of example, the first search region RR may have a rectangular shape having a size of 92 pixels (in the vertical direction)×92 pixels (in the horizontal direction). Further, with respect to each of the sets of the first template regions TR, TR, ... and the corresponding first search regions RR, RR, ... (a set of TR1 and RR1, a set of TR2 and RR2, and so on), the position matching processing means 13 determines a first subregion tR within the first search region RR, in which first subregion the degree of image pattern coincidence with the corresponding first template region TR is high. (At this time, as an index representing the degree of image pattern coincidence, for example, a normalized cross correlation value may be employed.) Furthermore, the position matching processing means 13 calculates a first position relationship, which is the corresponding position relationship between the first template region TR and the first subregion tR. In accordance with the first position relationship, the position matching processing means 13 calculates a first shift quantity (+Δx, +Δy), which is a translation quantity for causing the first template region TR to coincide with the first subregion tR.

(2) Thereafter, as for the second image P2, in accordance with the first shift quantity (+Δx, +Δy), the position matching processing means 13 sets a second template region TR' (one of TR'1, TR'2, ... ), which has its center point at the original center point having the coordinates (x0, y0). By way of example, the second template region TR' may have a rectangular shape having a size of 48 pixels (in the vertical direction)×48 pixels (in the horizontal direction). Also, as for the first image P1, the position matching processing means 13 sets a second search region RR' (one of RR'1, RR'2 ... ) having its center point at a position having coordinates (x', y') [=(x0+Δx, y0+Δy)] which position has been translated by the first shift quantity (+Δx, +Δy) from the center point having the coordinates (x0, y0) in the first subregion tR. The second search region RR' is larger than the second template region TR' and is smaller than the first search region RR. By way of example, the second search region RR' may have a rectangular shape having a size of 56 pixels (in the vertical direction)×56 pixels (in the horizontal direction) Further, with respect to each of the sets of the second template regions TR', TR', ... and the corresponding second search regions RR', RR', ... (a set of TR'1 and RR'1, a set of TR'2 and RR'2, and so on), the position matching processing means 13 determines a second subregion tR' within the second search region RR', in which second subregion the degree of image pattern coincidence with the corresponding second template region TR' is high. (At this time, as an index representing the degree of image pattern coincidence, for example, the total sum of the absolute values of the differences between pixel values may be employed.) Furthermore, the position matching processing means 13 calculates a second position relationship, which is the corresponding position relationship between the second template region TR' and the second subregion tR'. In accordance with the second position relationship, the position matching processing means 13 calculates a second shift quantity (+Δx', +Δy'), which is a translation quantity for causing the second template region TR' to coincide with the second subregion tR'.

(3) Thereafter, as for the second image P2, in accordance with the second shift quantity (+Δx', +Δy'), the position matching processing means 13 sets a third template region TR" (one of TR"1, TR"2, . . . ), which has its center point at the original center point having the coordinates (x0, y0). By way of example, the third template region TR" may have a rectangular shape having a size of 16 pixels (in the vertical direction)×16 pixels (in the horizontal direction) Also, as for the first image P1, the position matching processing means 13 sets a third search region RR" (one of RR"1, RR"2, . . . ) having its center point at a position having coordinates (x", y") [=(x'+Δx', y'+Δy')=(x0+Δx+Δx', y0+Δy+Δy')], which position has been translated by the second shift quantity (+Δx', +Δy') from the center point having the coordinates (x', y') in the second subregion tR'. The third search region RR" is larger than the third template region TR" and is smaller than the second search region RR'. By way of example, the third search region RR" may have a rectangular shape having a size of 20 pixels (in the vertical direction)×20 pixels (in the horizontal direction). Further, with respect to each of the sets of the third template regions TR", TR", . . . and the corresponding third search regions RR", RR", . . . (a set of TR"1 and RR"1, a set of TR"2 and RR"2, and so on), the position matching processing means 13 determines a third subregion tR" within the third search region RR", in which third subregion the degree of image pattern coincidence with the corresponding third template region TR" is high. (At this time, as an index representing the degree of image pattern coincidence, for example, the total sum of the absolute values of the differences between pixel values may be employed.) Furthermore, the position matching processing means 13 calculates a third position relationship, which is the corresponding position relationship between the third template region TR" and the third subregion tR". In accordance with the third position relationship, the position matching processing means 13 calculates a third shift quantity (+Δx", +Δy"), which is a translation quantity for causing the third template region TR" to coincide with the third subregion tR".

(4) Thereafter, with respect to the center point of each ROI (one of ROI1, ROI2, . . . ), the position matching processing means 13 calculates an ultimate translation quantity (i.e., an ultimate shift quantity), (+Δxi, +Δyi) where i=1, 2, . . . [=first shift quantity+second shift quantity+third shift quantity].

Also, in accordance with the translation quantities (+Δxi, +Δyi) of the center points of the respective ROI's in the second image P2, the position matching processing means 13 calculates the translation quantities of all of the pixels in each ROI in the second image P2 by performing, for example, interpolating operations (linear interpolation, spline interpolation, Bezier interpolation, or the like) utilizing the translation quantities of four neighboring points (the center points of the respective ROI's). Further, the position matching processing means 13 performs warping on the selected ROI in the first image P1 and in accordance with the translation quantities of the pixels in the second image P2, which translation quantities have been calculated. A first warping processed image P1' is obtained from the warping performed on the first image P1. In this manner, the position matching processing means 13 performs the matching of positions of the first warping processed image P1' and the second image P2.

How the image position matching apparatus 10 operates will be described hereinbelow.

Firstly, image signals representing the first image P1 and the second image P2, which have been acquired in the time series mode, are fed into the position matching processing means 13. As illustrated in FIGS. 3A and 3B, the position matching processing means 13 sets a plurality of ROI's on each of the received first image P1 and the received second image P2. The ROI's have their center points at the corresponding spatial coordinates on the first image P1 and the second image P2 and have the identical shape. Specifically, ROI1, ROI2, ROI3, . . . are set in the second image P2, and ROI1', ROI2', ROI3', . . . are set in the first image P1. Also, as illustrated in FIG. 4, the position matching processing means 13 performs the processing described below on the received first image P1 and the second image P2. Specifically, as for the second image P2 acting as the reference image, with respect to each ROI in the second image P2, the position matching processing means 13 sets the first template region TR (one of TR1, TR2, . . . ), which has its center point at the center point having the coordinates (x0, y0) in the ROI. By way of example, the first template region TR may have a rectangular shape having a size of 80 pixels (in the vertical direction)×80 pixels (in the horizontal direction). Also, as for the first image P1, with respect to each ROI in the first image P1, the position matching processing means 13 sets the first search region RR (one of RR1, RR2, . . . ), which has its center point at the same coordinates (x0, y0) as the coordinates of the centerpoint of the first template region TR and is larger than the first template region TR. By way of example, the first search region RR may have a rectangular shape having a size of 92 pixels (in the vertical direction)×92 pixels (in the horizontal direction). Further, with respect to each of the sets of the first template regions TR, TR, . . . and the corresponding first search regions RR, RR, . . . , the position matching processing means 13 determines the first subregion tR within the first search region RR, in which first subregion the degree of image pattern coincidence with the corresponding first template region TR is high. (At this time, as the index representing the degree of image pattern coincidence, for example, the normalized cross correlation value may be employed.) Furthermore, the position matching processing means 13 calculates the first position relationship, which is the corresponding position relationship between the first template region TR and the first subregion tR. In accordance with the first position relationship, the position matching processing means 13 calculates the first shift quantity (+Δx, +Δy), which is the translation quantity for causing the first template region TR to coincide with the first subregion tR.

Figure 5A:
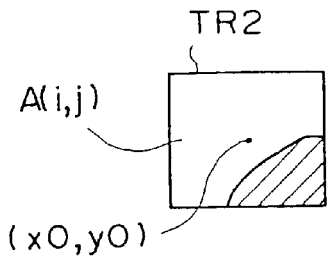
Figure 5B:
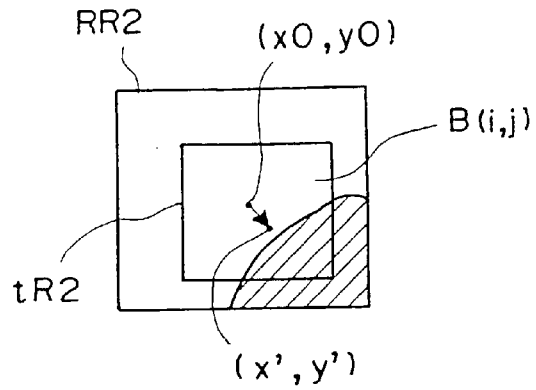

For example, as illustrated in FIGS. 5A and 5B, the image pattern within a first template region TR2 shown in FIG. 5A, which has its center point at the coordinates (x0, y0), is searched within the corresponding first search region RR2 shown in FIG. 5B, which has its center point at the coordinates (x0, y0). As a result, a first subregion tR2 having its center point at the coordinates (x', y') may be detected as the first subregion tR, in which the degree of image pattern coincidence with the first template region TR2 is the highest. In such cases, the first shift quantity (+Δx, +Δy) maybe calculated with the formula shown below.

$$(+\Delta x, +\Delta y)=(x'-x0, y'-y0)$$

Thereafter, as for the second image P2, the position matching processing means 13 sets the second template region TR' (one of TR'1, TR'2, . . . ), which has its centerpoint at the original center point having the coordinates (x0, y0) and is smaller than the first template region TR. By way of example, the second template region TR' may have a rectangular shape having a size of 48 pixels (in the vertical direction)×48 pixels (in the horizontal direction).

Also, as for the first image P1, the position matching processing means 13 sets the second search region RR' (one of RR'1, RR'2, . . . ) having its centerpoint at the position having coordinates (x', y') [=(x0+Δx, y0+Δy)], which position has been translated by the first shift quantity (+Δx, +Δy) from the center point having the coordinates (x0, y0) in the first subregion tR. The second search region RR' is larger than the second template region TR' and is smaller than the first search region RR. By way of example, the second search region RR' may have a rectangular shape having a size of 56 pixels (in the vertical direction)×56 pixels (in the horizontal direction) Further, with respect to each of the sets of the second template regions TR', TR', . . . and the corresponding second search regions RR', RR', . . . (the set of TR'1 and RR'1, the set of TR'2 and RR'2, and so on), the position matching processing means 13 determines the second subregion tR' within the second search region RR', in which second subregion the degree of image pattern coincidence with the corresponding second template region TR' is high. (At this time, as the index representing the degree of image pattern coincidence, for example, the total sum of the absolute values of the differences between pixel values may be employed.) Furthermore, the position matching processing means 13 calculates the second position relationship, which is the corresponding position relationship between the second template region TR' and the second subregion tR'. In accordance with the second position relationship, the position matching processing means 13 calculates the second shift quantity (+Δx', +Δy'), which is the translation quantity for causing the second template region TR' to coincide with the second subregion tR'.

Figure 6A:
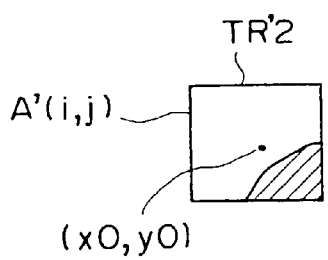
FIGS. 6A and 6B are explanatory views showing correspondence relationships among a second template region TR'2, a second search region RR'2, and a second subregion tR'2.
Figure 6B:
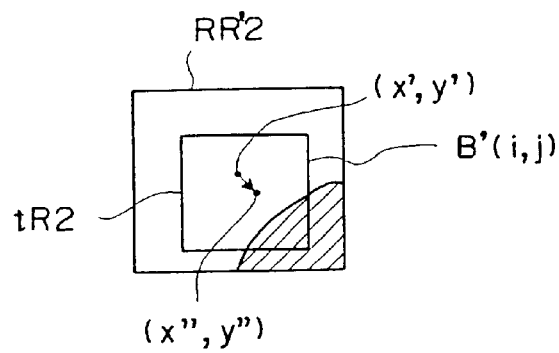

For example, as illustrated in FIGS. 6A and 6B, the image pattern within a second template region TR'2 shown in FIG. 6A, which has its center point at the coordinates (x0, y0), is searched within the corresponding second search region RR'2 shown in FIG. 6B, which has its center point at the coordinates (x', y'). As a result, a second subregion tR'2 having its center point at the coordinates (x'', y'') may be detected as the second subregion tR', in which the degree of image pattern coincidence with the second template region TR'2 is the highest. In such cases, the second shift quantity (+Δx', +Δy') may be calculated with the formula shown below.

$$(+\Delta x', +\Delta y') = (x'' - x', y'' - y')$$
$$= (x'' - x0 - \Delta x, y'' - y0 - \Delta y)$$

Thereafter, in the same manner as that described above, as for the second image P2, the position matching processing means 13 sets the third template region TR'' (one of TR''1, TR''2, . . . ), which has its center point at the original center point having the coordinates (x0, y0) and is smaller than the second template region TR'. By way of example, the third template region TR'' may have a rectangular shape having a size of 16 pixels (in the vertical direction)×16 pixels (in the horizontal direction). Also, as for the first image P1, the position matching processing means 13 sets the third search region RR'' (one of RR''1, RR''2, . . . ) having its center point at the position having coordinates (x'', y'') [=(x'+Δx', y'+Δy')], which position has been translated by the second shift quantity (+Δx', +Δy') from the center point having the coordinates (x', y') in the second subregion tR'. The third search region RR'' is larger than the third template region TR'' and is smaller than the second search region RR'. By way of example, the third search region RR'' may have a rectangular shape having a size of 20 pixels (in the vertical direction)×20 pixels (in the horizontal direction). Further, with respect to each of the sets of the third template regions TR'', TR'', . . . and the corresponding third search regions RR'', RR'', . . . (the set of TR''1 and RR''1, the set of TR''2 and RR''2, and so on), the position matching processing means 13 determines the third subregion tR'' within the third search region RR'', in which third subregion the degree of image pattern coincidence with the corresponding third template region TR'' is high. (At this time, as the index representing the degree of image pattern coincidence, for example, the total sum of the absolute values of the differences between pixel values may be employed.) Furthermore, the position matching processing means 13 calculates the third position relationship, which is the corresponding position relationship between the third template region TR'' and the third subregion tR''. In accordance with the third position relationship, the position matching processing means 13 calculates the third shift quantity (+Δx'', +Δy''), which is the translation quantity for causing the third template region TR'' to coincide with the third subregion tR''.

For example, the image pattern within a third template region TR''2, which has its center point at the coordinates (x0, y0), is searched within the corresponding third search region RR''2, which has its center point at the coordinates (x'', y''). As a result, a third subregion tR''2 having its center point at coordinates (x°, y°) may be detected as the third subregion tR'', in which the degree of image pattern coincidence with the third template region TR''2 is the highest. In such cases, the third shift quantity (+Δx'', +Δy'') may be calculated with the formula shown below.

$$(+\Delta x'', +\Delta y'') = (x° - x'', y° - y'')$$
$$= (x° - x0 - \Delta x - \Delta x', y° - y0 - \Delta y - \Delta y')$$

As described above, with respect to each of the sets of the corresponding local area limited regions, the sizes of the template region and the search region are reduced in stages, and the shift quantity (+Δxi, +Δyi), where i=1, 2, . . . , between the center points of the corresponding local area limited regions in the first image P1'' and the second image P2 is calculated. The shift quantity (+Δxi, +Δyi), where i=1, 2, . . . , may be represented by the formula shown below.

$$(+\Delta xi, +\Delta yi) = (x°i - x0i, y°i - y0i)$$
$$= (\Delta xi + \Delta x'i + \Delta x''i, \Delta yi + \Delta y'i + \Delta y''i)$$

The position matching processing means 13 calculates the ultimate shift quantity (+Δxi, +Δyi) with respect to each of the center points of the local area limited regions in the second image P2.

Also, in accordance with the shift quantities (+Δxi, +Δyi) of the center points of the respective ROI's in the second image P2, the position matching processing means 13 calculates the shift quantities of all of the pixels in each ROI in the second image P2 by performing for example, linear interpolating operations utilizing the shift quantities of the four neighboring points (the centerpoints of the respective ROI's). Alternatively, in lieu of the linear interpolating operations, one of other interpolating operations, such as spline interpolation, Bezier interpolation, and NURBS interpolation (weighted B spline interpolation, may be employed. Also, the number of the neighboring points utilized in the interpolating operations is not limited to four and may be set appropriately in accordance with the kind of the interpolating operations, and the like. (For example, 16 neighboring points may be utilized.)

Figure 7:
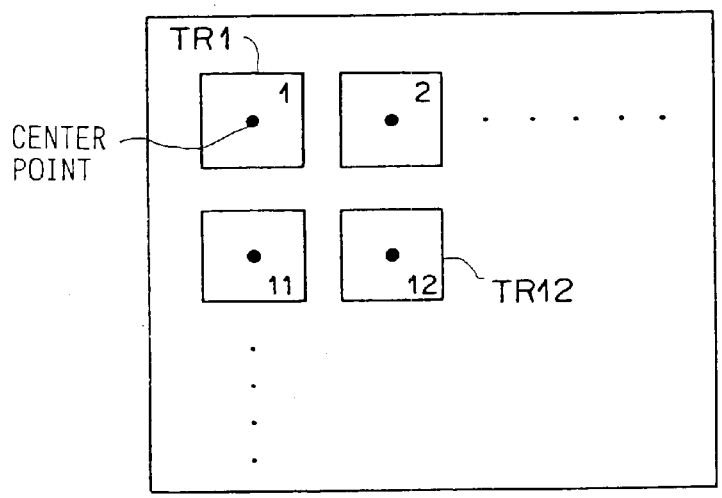
FIG. 7 is an explanatory view showing template regions TR, TR, . . . in a second image P2.
Figure 8:
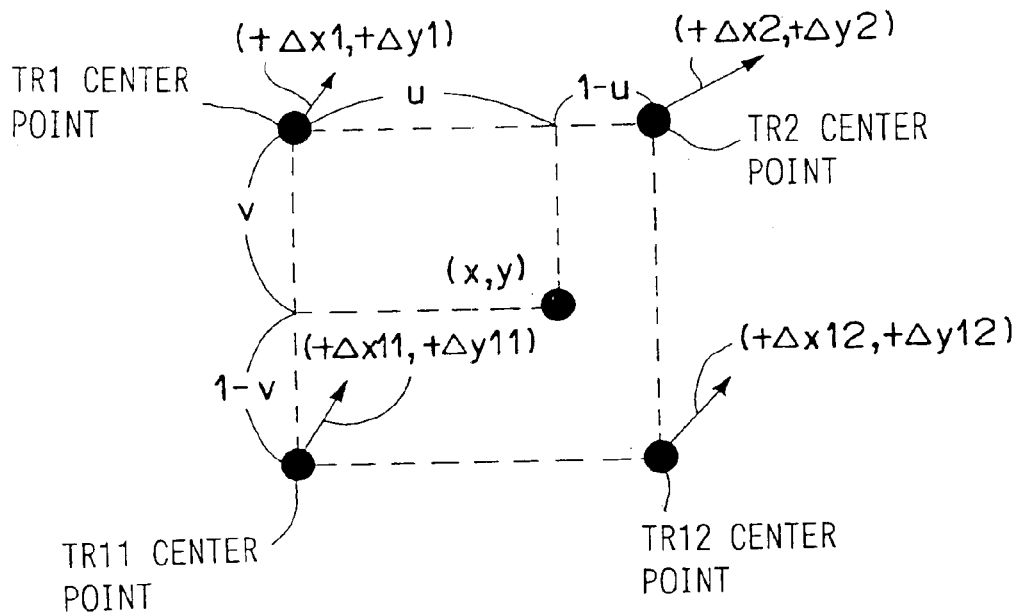
FIG. 8 is an explanatory view showing a linear interpolating operation, in which four neighboring points are utilized.

Specifically, the template regions TR1, TR2, . . . , TR11, TR12, . . . in the second image P2 may be arrayed in the pattern illustrated in FIG. 7. In such cases, as described above, the shift quantity of the center point of the template region TR1 is (+Δx1, +Δy1) [i.e., (+Δxi, +Δyi), where i=1], and the shift quantity of the center point of the template region TR2 is (+Δx2, +Δy2). Also, the shift quantity of the centerpoint of the template region TR11 is (+Δx11, +Δy11), and the shift quantity of the center point of the template region TR12 is (+Δx12, +Δy12). As illustrated in FIG. 8, the shift quantity (+Δx(x), +Δy(y)) of each pixel having the coordinates (x, y), which pixel falls within the range surrounded by the four center points of the four template regions TR1, TR2, TR11, and TR12, may be calculated with the linear interpolating operations in the two-dimensional plane. The calculations may be made with the formulas shown below.

$$\Delta x(x) = (1-u)(1-v)\Delta x1 + u(1-v)\Delta x2 + (1-u)v\Delta x11 + uv\Delta x12$$
$$\Delta y(y) = (1-u)(1-v)\Delta y1 + u(1-v)\Delta y2 + (1-u)v\Delta y11 + uv\Delta y12$$

In the manner described above, the shift quantities (+Δx(x), +Δy(y)) of the pixels having the coordinates (x, y), which pixels fall within the selected ROI in the second image P2, are calculated by the position matching processing means 13. In accordance with the thus calculated shift quantities (+Δx(x), +Δy(y)), the position matching processing means 13 performs the warping on the pixels, which fall within the ROI in the first image P1, in order to obtain the first warping processed image P1'.

Figure 9:
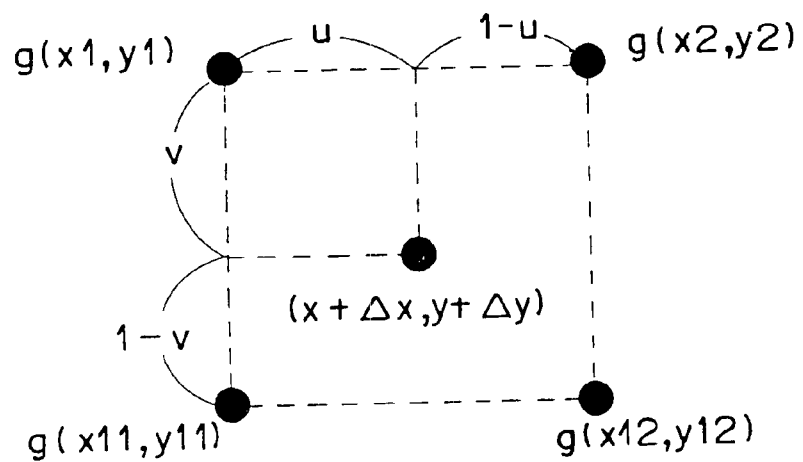
FIG. 9 is an explanatory view showing linear interpolating processing in a two-dimensional plane, in which four neighboring points are utilized, and which is performed with respect to a pixel in a first warping processed image P1'.

The pixel array in the first warping processed image P1', which has been obtained in the manner described above, is different from the pixel array in the second image P2. Therefore, in cases where it is considered that, for example, a subtraction process will be performed on corresponding pixels in the two images, and the image will be displayed, it is necessary for the pixel array in the first warping processed image P1' to be caused to coincide with the pixel array in the second image P2, which acts as the reference image. Accordingly, as illustrated in FIG. 9, the position matching processing means 13 performs linear interpolating processing in the two-dimensional plane on the pixels in the first warping processed image P1' and calculates the pixel values with the formula shown below.

$$g(x+\Delta x, y+\Delta y) = (1-u)(1-v)g(x1, y1) + u(1-v)g(x2, y2) +$$
$$(1-u)vg(x11, y11) + uvg(x12, y12)$$

As described above, with the first embodiment of the apparatus for matching positions of images in accordance with the present invention, with respect to the two images to be subjected to the position matching processing, the size of the template region and the size of the corresponding search region in the two images are reduced successively, and the template region and the corresponding search region are set successively in accordance with the corresponding position relationship, which has been calculated. Also, the corresponding position relationships are calculated successively such that the degree of image pattern coincidence becomes high, and the position matching is performed in accordance with the ultimate corresponding position relationship, which is calculated ultimately. Therefore, the shift between the two images is capable of being suppressed more reliably than with the conventional image position matching techniques and is capable of being eliminated accurately. Also, the image obtained from the position matching is capable of being prevented from becoming distorted unnaturally.

In the first embodiment described above, in cases where the size of the template region and the size of the search region are reduced in stages, and the corresponding position relationship in each of the stages is calculated, the template region having a reduced size is set at the position identical with the position, at which the template region in the preceding stage was set, and the search region having a reduced size is set at the position identical with the position, at which the search region in the preceding stage was set. Alternatively, in cases where the template regions having the reduced size and the search regions having the reduced size are set, the number of the template regions having the reduced size and the number of the search regions having the reduced size may be increased, and the template regions having the reduced size and the search regions having the reduced size maybe set at positions different from the positions in the preceding stage. An example of how the second template regions and the second search regions are set will be described hereinbelow with reference to FIGS. 19A, 19B, 19C, and 19D.

Figure 19A:
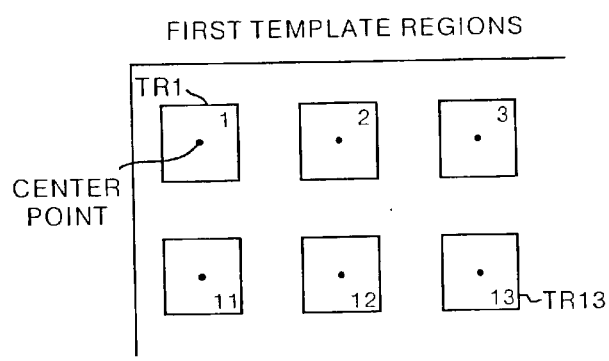
FIGS. 19A, 19B, 19C, and 19D are explanatory views showing an example of how second template regions and second search regions are set.
Figure 19B:
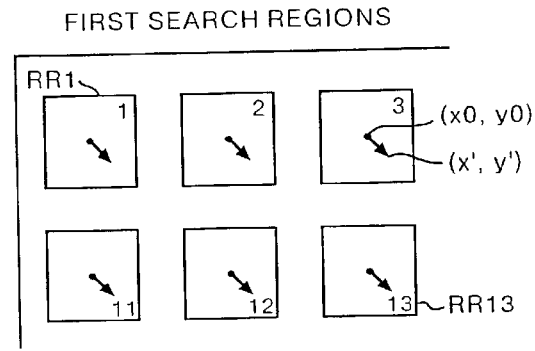
Figure 19C:
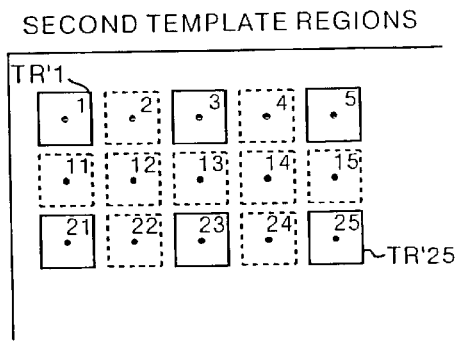
Figure 19D:
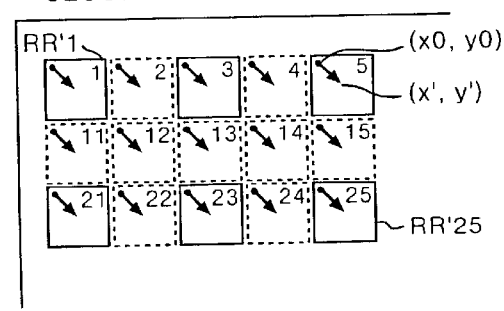

As indicated by the solid lines in FIG. 19C, each of the second template regions TR ', TR ', . . . is set as a region, which has a size smaller than the size of each of the first template regions TR, TR, . . . and has its center point at the coordinates identical with the coordinates (x0, y0) of the center point of the first template region TR. Also, as indicated by the broken lines in FIG. 19C, a new second template region TR', which has the size identical with the size of the second template regions TR', TR', . . . , is set between adjacent second template regions TR', TR'. As indicated by the solid lines in FIG. 19D, in the same manner as that in the first embodiment described above, wherein the second search region RR' is set at the position, which is identical with the position of the first search region RR in the preceding stage, each of the second search regions RR', RR ', is set as a region having its center point at the position having coordinates (x', y') [=(x0+Δx, y0+Δy)], which position has been translated by the first shift quantity (+Δx, +Δy) from the center point having the coordinates (x0, y0) in the first subregion tR. The second search region RR' is larger than the second template region TR' and is smaller than the first search region RR. Also, as indicated by the broken lines in FIG. 19D, a new second search region RR', which has the size identical with the size of the second search regions RR', RR', . . . , is set between adjacent second search regions RR', RR'. At this time, the first shift quantity with respect to the new second search region RR' is calculated with an interpolating operation utilizing the first shift quantities with respect to the four neighboring second search regions RR', RR', . . . , which first shift quantities have already been calculated. Specifically, the first shift quantity with respect to the new second search region RR'12 is calculated with an interpolating operation utilizing the first shift quantities with respect to the second search regions RR'1, RR'3, RR'21, and RR'23. Also, the first shift quantity with respect to the new second search region RR'11, which does not have the four neighboring second search regions, is calculated with an interpolating operation utilizing the first shift quantities with respect to the second search regions RR'1, and RR'21.

In an example of the setting of the template regions and the search regions, the size of the first template region may be 90 pixels (in the vertical direction)×90 pixels (in the horizontal direction), the size of the first search region may be 160 pixels (in the vertical direction)×160 pixels (in the horizontal direction), and a first step number (i.e, the intervals between the center points of the adjacent ROI's) maybe 200 pixels. Also, the size of the second template region may be 48 pixels (in the vertical direction)×48 pixels (in the horizontal direction), the size of the second search region may be 78 pixels (in the vertical direction)×78 pixels (in the horizontal direction), and a second step number may be 100 pixels.

Alternatively, the template regions and the search regions may be set in one of various other manners. For example, the number of the regions, which are set, may be (a) increased, (b), kept identical, or (c) decreased. Also, the sizes of the regions may be set such that (d) both the sizes of the template region and the search region are reduced, or (e) the size of the template region is kept unchanged, and only the size of the search region is reduced. The above-enumerated ways of the setting may be combined in various manners. As an example of the combination capable of yielding a high position matching accuracy, the following combination may be employed: the size of the first template region is 90 pixels (in the vertical direction)×90 pixels (in the horizontal direction), the size of the first search region is 160 pixels (in the vertical direction)×160 pixels (in the horizontal direction), the first step number is 90 pixels, the size of the second template region is 48 pixels (in the vertical direction)×48 pixels (in the horizontal direction), the size of the second search region is 78 pixels (in the vertical direction)×78 pixels (in the horizontal direction), the second step number is 48 pixels, the size of the third template region is 48 pixels (in the vertical direction)×48 pixels (in the horizontal direction), the size of the third search region is 58 pixels (in the vertical direction)×58 pixels (in the horizontal direction), and the third step number is 48 pixels.

The template regions may be set such that adjacent template regions may not overlap each other, and the search regions may be set such that adjacent search regions may not overlap each other. Alternatively, the template regions may be set such that adjacent template regions may overlap each other, and the search regions may be set such that adjacent search regions may overlap each other.

In the first embodiment described above, the position matching processing means 13 has the functions for setting the corresponding ROI's over the entire areas of the first image P1 and the second image P2. However, the functions are an additional feature for clarifying the correspondence relationship between the template regions and the search regions in the two images. In cases where the template regions and the search regions are set over the entire areas of the two images, such that the positions of the center points of the template regions in the second image P2 and the positions of the center points of the search regions in the first image P1 correspond to each other, the position matching processing means 13 need not necessarily be provided with the functions for setting the corresponding ROI's over the entire areas of the first image P1 and the second image P2.

Figure 10:
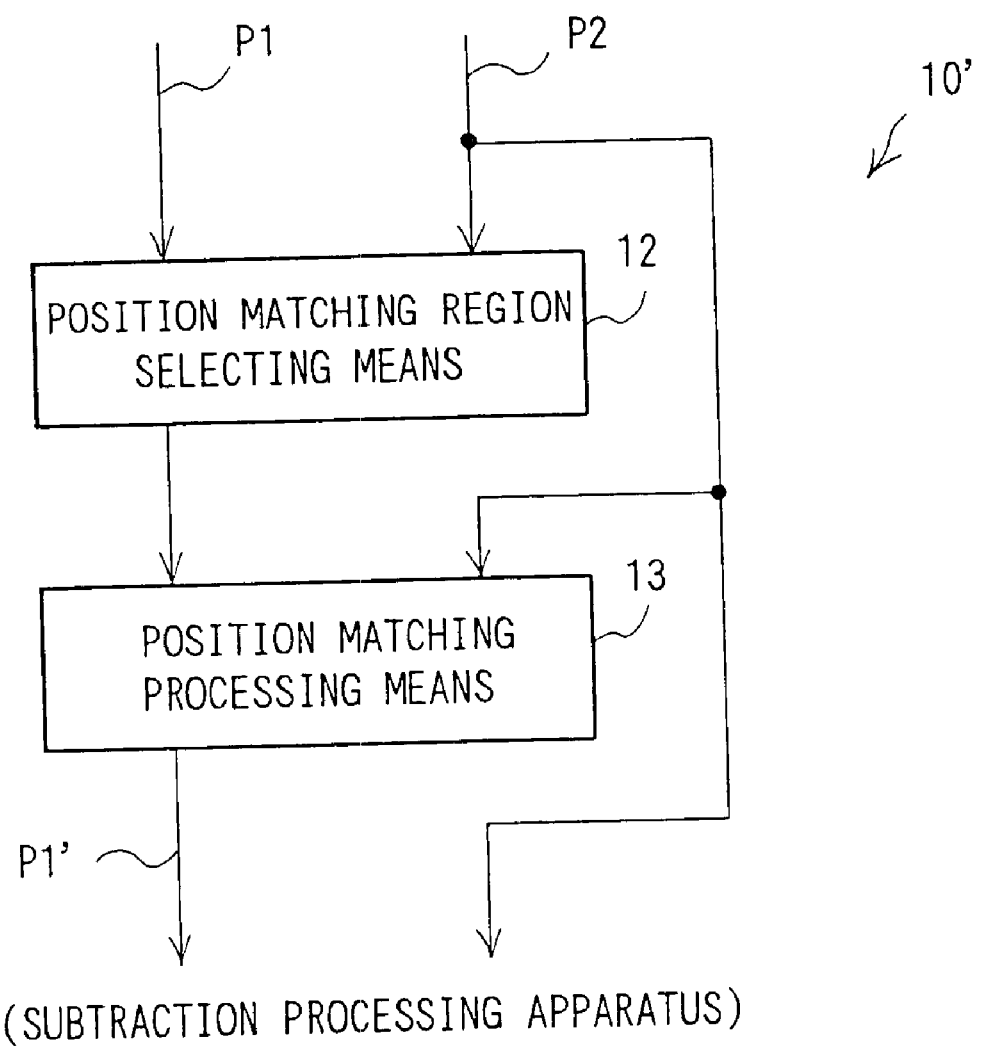
FIG. 10 is a block diagram showing a second embodiment of the apparatus for matching positions of images in accordance with the present invention.
Figure 11:
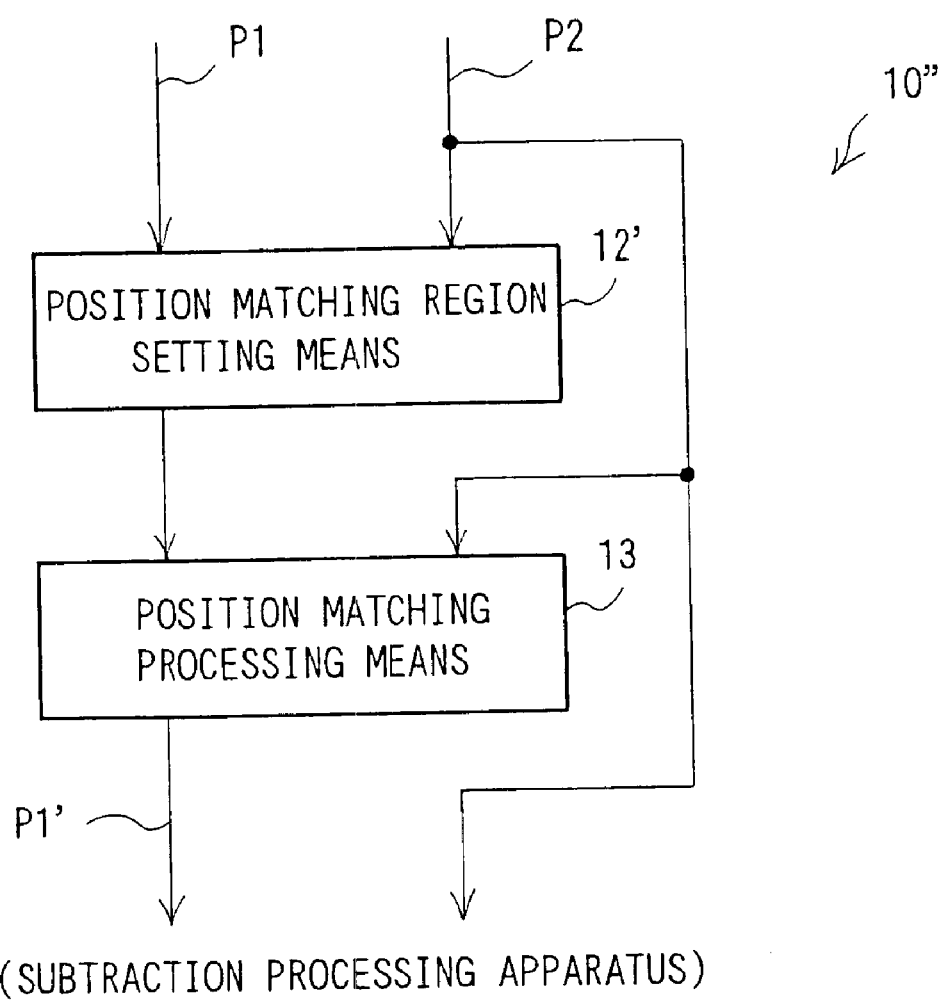
FIG. 11 is a block diagram showing a third embodiment of the apparatus for matching positions of images in accordance with the present invention.

Also, in the first embodiment described above, the position matching processing means 13 has the functions for setting the template regions over the entire area of the second image P2 and setting the search regions, each of which corresponds to one of the template regions, over the entire area of the first image P1. Alternatively, in at least one stage among the stages, in which the corresponding position relationships are calculated in stages, the setting of the template regions and the search regions may be performed with respect to only the regions in the two images P1 and P2, between which regions the degree of shift is high. FIG. 10 and FIG. 11 respectively show second and third embodiments of the apparatus for matching positions of images in accordance with the present invention, wherein the setting of the template regions and the search regions is performed with respect to only the regions in the two images P1 and P2, between which regions the degree of shift is high.

In the second embodiment shown in FIG. 10, an image position matching apparatus 10' comprises position matching region selecting means 12 and the position matching processing means 13. Prior to the setting of the template regions and the corresponding search regions performed by the position matching processing means 13, the position matching region selecting means 12 automatically selects the local area limited regions, between which the degree of shift is high, by setting a plurality of local area limited regions (ROI's) over the entire area of one of the two images P1 and P2, setting a plurality of ROI's, each of which corresponds to one of the ROI's in the one image, over the entire area of the other image, calculating the degree of shift between corresponding ROI's in the two images P1 and P2 and with respect to each of sets of the corresponding ROI's in the two images P1 and P2, and automatically selecting the local area limited regions, between which the degree of shift is high, in the two images in accordance with the thus calculated degrees of shift. Also, the position matching processing means 13 sets the template regions and the corresponding search regions with respect to only the ROI's, which have been selected by the position matching region selecting means 12, and determines the subregions.

In the third embodiment shown in FIG. 11, an image position matching apparatus 10" comprises position matching region setting means 12' and the position matching processing means 13. Prior to the setting of the template regions and the corresponding search regions performed by the position matching processing means 13, the position matching region setting means 12' manually sets corresponding local area limited regions (ROI's), between which the degree of shift is high, in the two images P1 and P2. Also, the position matching processing means 13 sets the template regions and the corresponding search regions with respect to only the ROI's, which have been set by the position matching region setting means 12', and determines the subregions.

Figure 12:
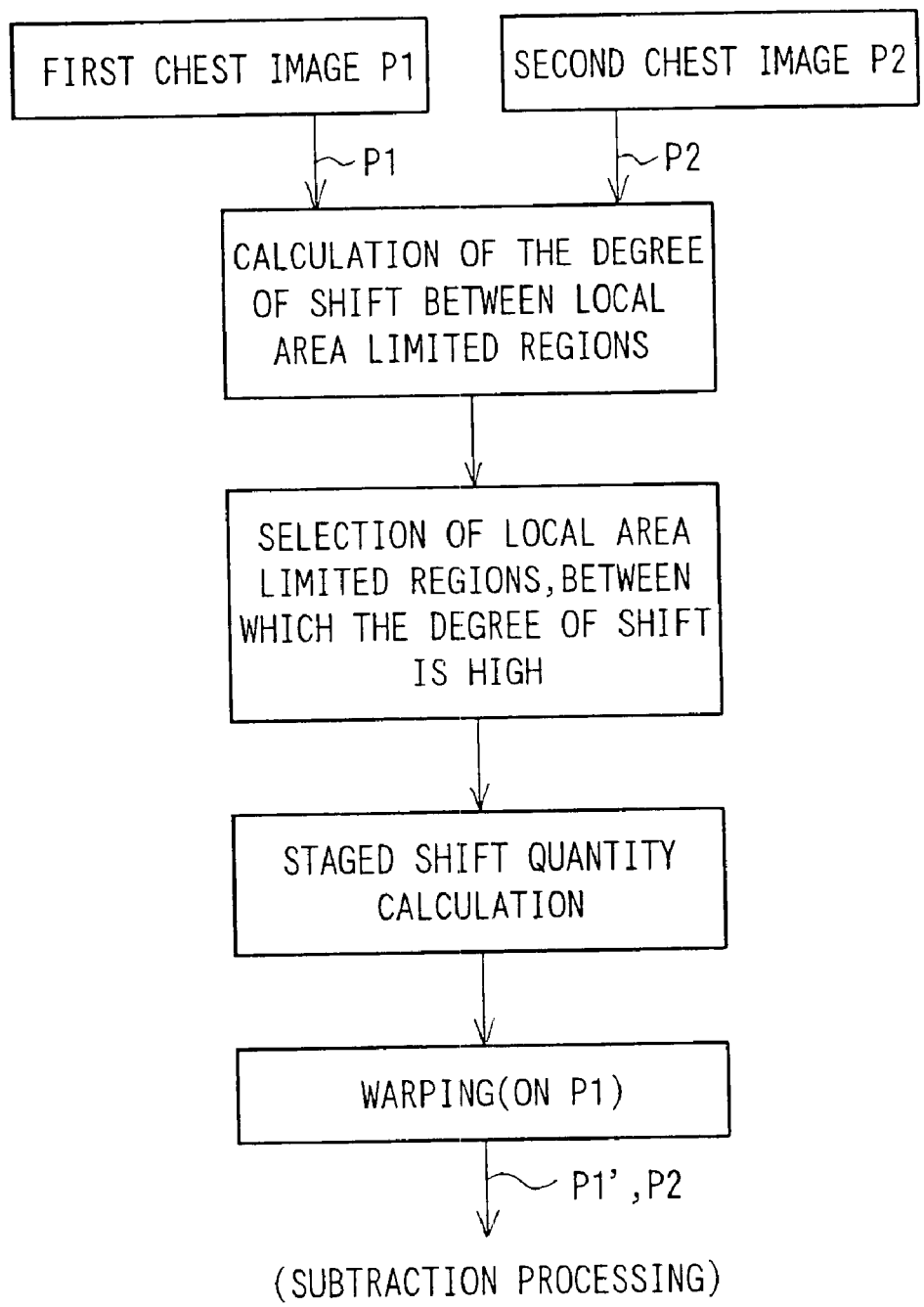
FIG. 12 is a flow chart showing a processing flow in the second embodiment of FIG. 10.
Figure 13:
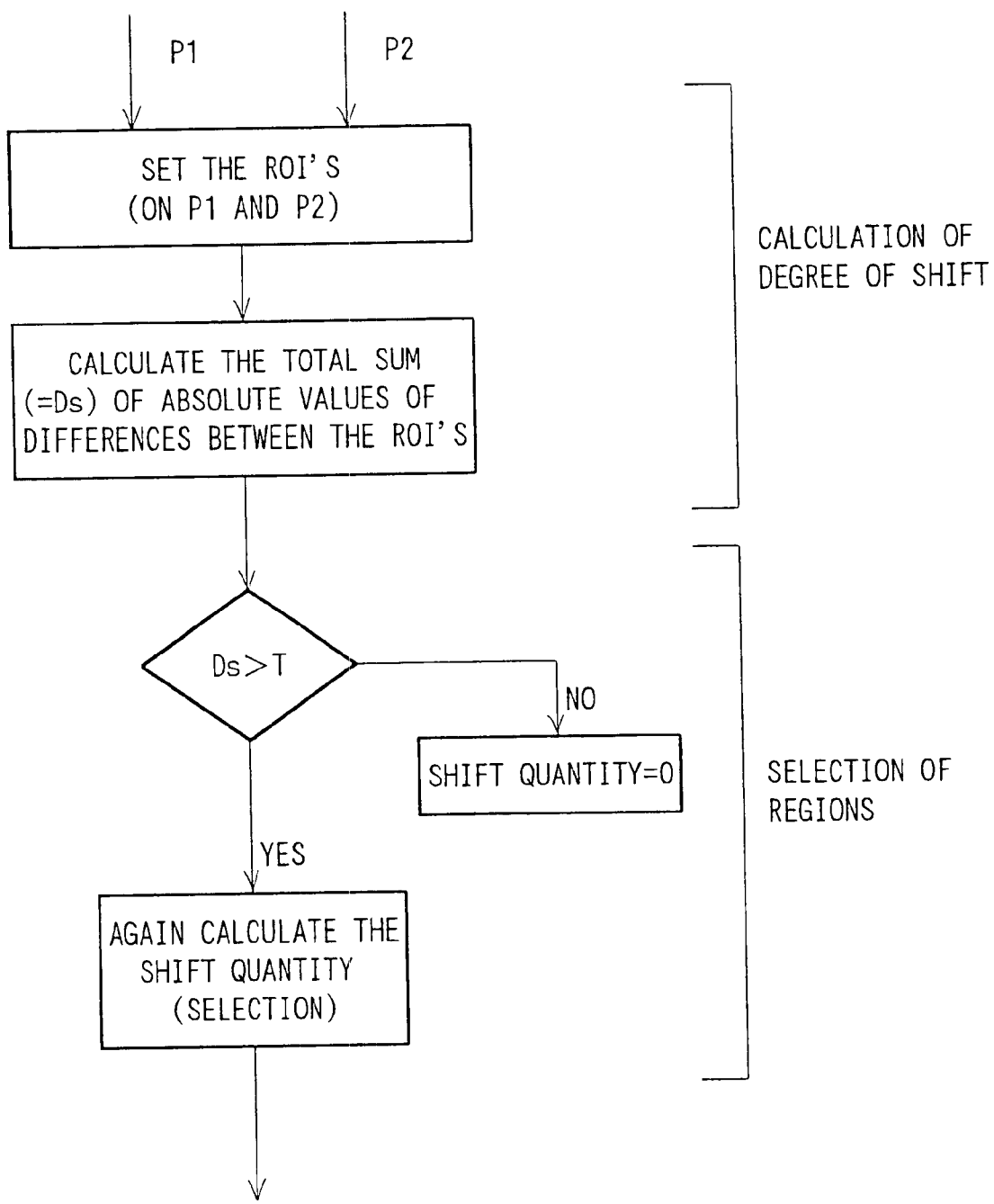
FIG. 13 is a detailed flow chart showing part of the processing flow shown in FIG. 12.

FIG. 12 shows a processing flow in the image position matching apparatus 10' of FIG. 10, which acts as the second embodiment and is provided with the position matching region selecting means 12. As illustrated in FIG. 12, the image signals representing the first image P1 and the second image P2, which have been bed into the image position matching apparatus 10', are fed into the position matching region selecting means 12. As illustrated in FIGS. 3A and 3B, FIG. 12, and FIG. 13, the position matching region selecting means 12 sets a plurality of ROI's on each of the received first image P1 and the received second image P2. The ROI's have their center points at the corresponding spatial coordinates on the first image P1 and the second image P2 and have an identical shape, e.g. a rectangular shape having a size of 16 pixels (in the vertical direction)×16 pixels (in the horizontal direction). Specifically, ROI1, ROI2, ROI3, . . . are set in the second image P2, and ROI1', ROI2', ROI3', . . . are set in the first image P1. with respect to each of sets of the corresponding ROI's (e.g., a set of ROI1 and ROI1', a set of ROI2 and ROI2', and so on) in the second image P2 and the first image P1, the position matching region selecting means 12 calculates a total sum value Ds of absolute values of pixel value differences between corresponding pixels (i.e., the pixels having identical spatial coordinates) in the corresponding ROI's as an index representing the degree of image pattern coincidence between the corresponding ROI's. Specifically, as the index representing the degree of image pattern coincidence between the corresponding ROI's, the position matching region selecting means 12 calculates the total sum value Ds $[=\Sigma\Sigma|A(i,j)-B(i,j)|]$ of the absolute values of the differences $[=|A(i,j)-B(i,j)|]$ between the pixel values of the corresponding pixels [a pixel value $A(i,j)$ of the pixel within the ROI in the second image P2 and a pixel value $B(i,j)$ of the corresponding pixel within the corresponding ROI in the first image P1]. Also, the position matching region selecting means 12 compares the thus obtained total sum value Ds with a threshold value T having been set previously. The position matching region selecting means 12 selects the corresponding ROI s, which are associated with the total sum value Ds larger than the threshold value T (Ds>T), as the local area limited regions, between which the level of the position matching is low (i.e., the degree of shift is high), and which are to be subjected to the position matching processing performed by the position matching processing means 13. Also, the position matching region selecting means 12 regards the corresponding ROI's, which are associated with the total sum value Ds not larger than the threshold value T (Ds$\leq$T), as the local area limited regions, between which the level of the position matching is high. The position matching region selecting means 12 does not select the corresponding ROI's, which are associated with the total sum value Ds not larger than the threshold value T, as the local area limited regions, which are to be subjected to the position matching processing.

In cases where the position matching processing means 13 is constituted in the manner described above so as to perform the setting of the template region and the search region with respect to only the ROI's, between which the degree of shift is high, the shift quantity $(+\Delta xi, +\Delta yi)$ between the ultimate corresponding positions of the center points of the ROI's, between which the degree of shift is low, may be uniformly set to be (0, 0). In this manner, the shift quantities of the center points of all of the ROI's in the second image P2 may be set. Also, in accordance with the thus set shift quantities, the shift quantities of the pixels in the second image P2 may be calculated with the interpolating operations described above utilizing the shift quantities of the four neighboring points (the center points of the ROI's).

Figure 14:
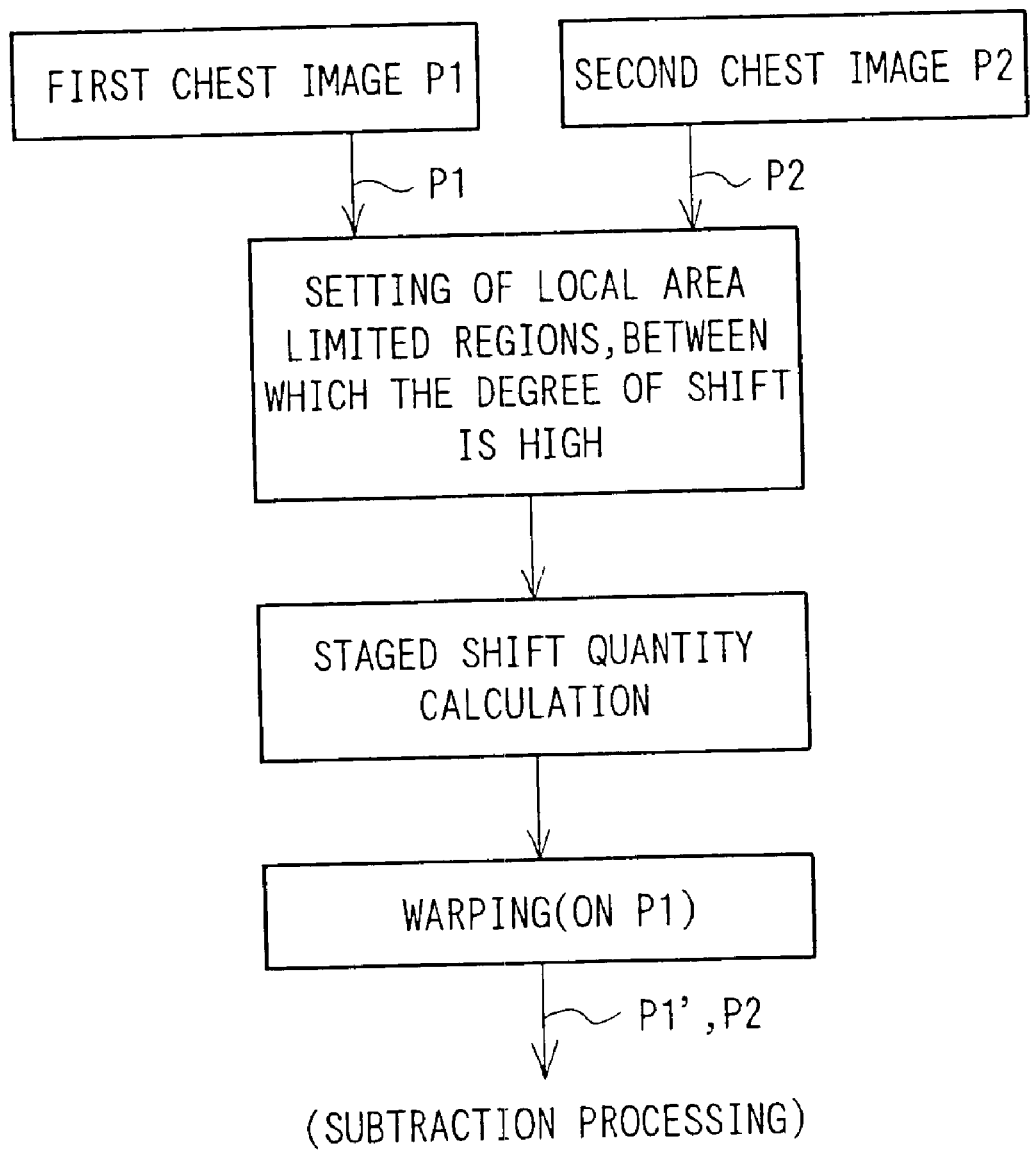
FIG. 14 is a flow chart showing a processing flow in the third embodiment of FIG. 11.

FIG. 14 shows a processing flow in the image position matching apparatus 10" of FIG. 11, which acts as the third embodiment and is provided with the position matching region setting means 12'. In the image position matching apparatus 10" of FIG. 11, as in the image position matching apparatus 10' of FIG. 10, the position matching processing means 13 performs the setting of the template regions and the search regions with respect to only the certain corresponding ROI's. As described above, in the image position matching apparatus 10' of FIG. 10, the ROI's, for which the template regions and the search regions are to be set, are selected automatically. In the image position matching apparatus 10" of FIG. 11, the ROI's, for which the template regions and the search regions are to be set, are set by the position matching region setting means 12' in the manual mode, wherein the person, who sees the images, recognizes the ROI's as the local area limited regions, between which the degree of shift is high, and manually sets the recognized ROI's as the ROI's, for which the template regions and the search regions are to be set. Also, the position matching processing means 13 performs the setting of the template regions and the search regions with respect to only the corresponding ROI's, which have been set manually with the position matching region setting means 12'. The position matching region setting means 12' should preferably be constituted such that, when the person, who sees the images, has manually set a certain local area limited region (ROI) in one of the images (e.g., in the second image P2) as the ROI, which is associated with a low degree of image pattern coincidence, by utilizing the position matching region setting means 12', the position matching region setting means 12' automatically sets a corresponding local area limited region (ROI) in the other image (e.g, in the first image P1), which corresponding local area limited region has its center point at spatial coordinates identical with the spatial coordinates of the center point of the ROI having been set manually in the one image and has a shape identical with the shape of the ROI having been set manually in the one image. Ordinarily, it is not easy to manually set the two regions (two corresponding ROI's), which have their center points at the identical spatial coordinates and have the identical shape, in the two images.

In the second and third embodiments described above, before the setting of the ROI's in the original stage is performed, the local area limited regions, between which the degree of shift is high, are selected (or set). Alternatively, before the setting of the ROI's in an arbitrary stage is performed, the local area limited regions, between which the degree of shift is high, may be selected (or set).

Figure 15:
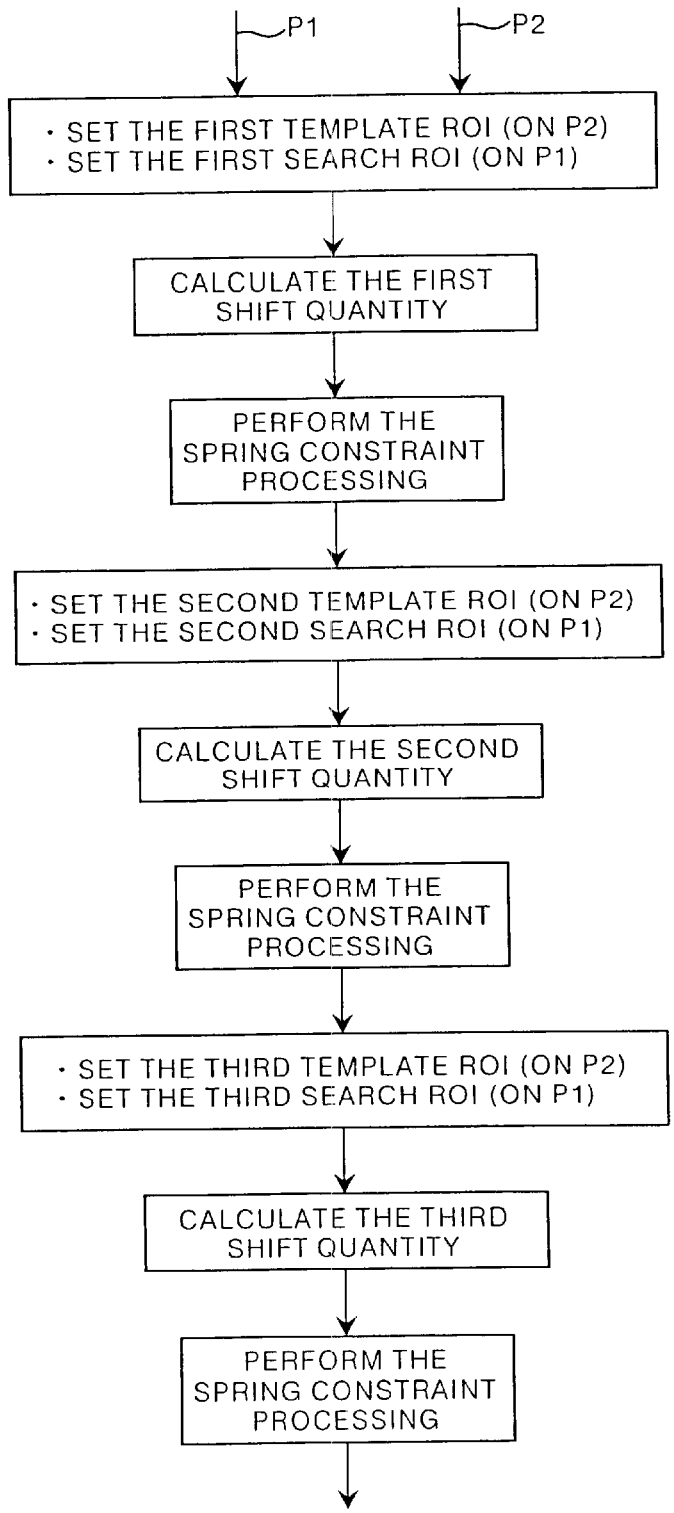
FIG. 15 is a detailed flow chart showing part of a processing flow in a fourth embodiment of the apparatus for matching positions of images in accordance with the present invention, in which spring constraint processing is employed.

A fourth embodiment of the apparatus for matching positions of images in accordance with the present invention will be described hereinbelow. Basically, the fourth embodiment of the apparatus for matching positions of images in accordance with the present invention is constituted and operates in the same manner as that in the first embodiment described above (with reference to FIG. 1 and FIG. 2), except for the features described below. The fourth embodiment of the apparatus for matching positions of images in accordance with the present invention has the general constitution as illustrated in FIG. 2. FIG. 15 shows a flow of staged shift quantity calculation processing performed by the position matching processing means 13 in the fourth embodiment.

In the fourth embodiment, the position matching processing means 13 operates in the manner described below. Specifically, in each of the stages associated with the operation for reducing the sizes of the template region and the search region in stages, the position matching processing means 13 calculates the corresponding position relationship of each stage. Thereafter, the position matching processing means 13 performs spring constraint processing and calculates a spring constraint processed corresponding position relationship in each stage. The spring constraint processed corresponding position relationship, which has thus been calculated, is taken as the corresponding position relationship in each stage. Also, the position matching processing means 13 iterates the operations for successively calculating the spring constraint processed corresponding position relationships in the respective stages and thereby calculates the ultimate corresponding position relationship.

More specifically, as illustrated in FIG. 15, the position matching processing means 13 in the fourth embodiment performs the staged shift quantity calculation processing described below.

(1) As for the second image P2 acting as the reference image, with respect to each ROI in the second image P2, the position matching processing means 13 sets the first template region TR one of TR1, TR2, ... ), which has its center point at the center point having coordinates (x0, y0) in the ROI. By way of example, the first template region TR may have a rectangular shape having a size of 80 pixels (in the vertical direction)×80 pixels (in the horizontal direction). Also, as for the first image P1, with respect to each ROI in the first image P1, the position matching processing means 13 sets the first search region RR (one of RR1, RR2, ... ), which has its center point at the same coordinates (x0, y0) as the coordinates of the centerpoint of the first template region TR and is larger than the first template region TR. By way of example, the first search region RR may have a rectangular shape having a size of 92 pixels (in the vertical direction)×92 pixels (in the horizontal direction). Further, with respect to each of the sets of the first template regions TR, TR, ... and the corresponding first search regions RR, RR, ... (the set of TR1 and RR1, the set of TR2 and RR2, and so on), the position matching processing means 13 determines the first subregion tR within the first search region RR, in which first subregion the degree of image pattern coincidence with the corresponding first template region TR is high. (At this time, as the index representing the degree of image pattern coincidence, for example, the normalized cross correlation value may be employed.) Furthermore, the position matching processing means 13 calculates the first position relationship, which is the corresponding position relationship between the first template region TR and the first subregion tR. In accordance with the first position relationship, the position matching processing means 13 calculates the first shift quantity (+Δx, +Δy), which is the translation quantity for causing the first template region TR to coincide with the first subregion tR. Also, the position matching processing means 13 calculates a shift quantity with respect to each of sets of small regions, which have been set around the first template region TR, and the corresponding small regions, which have been set around the first subregion tR. Further, the position matching processing means 13 performs the spring constraint processing in accordance with the first shift quantity (+Δx, +Δy) and the shift quantities having been calculated with respect to the sets of the small regions. In this manner, the position matching processing means 13 calculates a first spring constraint processed shift quantity (+ΔX, +ΔY).

(2) Thereafter, as for the second image P2, in accordance with the first spring constraint processed shift quantity (+ΔX, +ΔY), the position matching processing means 13 sets a second template region TR' (one of TR'1, TR'2, ... ), which has its center point at the original center point having the coordinates (x0, y0). By way of example, the second template region TR' may have a rectangular shape having a size of 48 pixels (in the vertical direction)×48 pixels (in the horizontal direction). Also, as for the first image P1, the position matching processing means 13 sets a second search region RR' (one of RR'1, RR'2, ... ) having its center point at a position having coordinates (x', y') [=(x0+ΔX, y0+ΔY)], which position has been translated by the first spring constraint processed shift quantity (+ΔX, +ΔY) from the center point having the coordinates (x0, y0) in the first subregion tR. The second search region RR' is larger than the second template region TR' and is smaller than the first search region RR. By way of example, the second search region RR' may have a rectangular shape having a size of 56 pixels (in the vertical direction)×56 pixels (in the horizontal direction). Further, with respect to each of the sets of the second template regions TR', TR', ... and the corresponding second search regions RR', RR', ... (a set of TR'1 and RR'1, a set of TR'2 and RR'2, and so on), the position matching processing means 13 determines a second subregion tR' within the second search region RR', in which second subregion the degree of image pattern coincidence with the corresponding second template region TR' is high. (At this time, as an index representing the degree of image pattern coincidence, for example, the total sum of the absolute values of the differences between pixel values may be employed.) Furthermore, the position matching processing means 13 calculates a second position relationship, which is the corresponding position relationship between the second template region TR' and the second subregion tR'. In accordance with the second position relationship, the position matching processing means 13 calculates a second shift quantity (+Δx', +Δy'), which is a translation quantity for causing the second template region TR' to coincide with the second subregion tR'. Also, the position matching processing means 13 calculates a shift quantity with respect to each of sets of small regions, which have been set around the second template region TR', and the corresponding small regions, which have been set around the second subregion tR'. Further, the position matching processing means 13 performs the spring constraint processing in accordance with the second shift quantity (+Δx', +Δy') and the shift quantities having been calculated with respect to the sets of the small regions. In this manner, the position matching processing means 13 calculates a second spring constraint processed shift quantity (+ΔX', +ΔY').

(3) Thereafter, as for the second image P2, in accordance with the second spring constraint processed shift quantity (+ΔX', +ΔY'), the position matching processing means 13 sets a third template region TR" (one of TR"1, TR"2, ... ), which has its center point at the original center point having the coordinates (x0, y0). By way of example, the third template region TR" may have a rectangular shape having a size of 16 pixels (in the vertical direction)×16 pixels (in the horizontal direction) Also, as for the first image P1, the position matching processing means 13 sets a third search region RR" (one of RR"1, RR"2, ... ) having its center point at a position having coordinates (x", y") [=(x'+ΔX', y'+ΔY')= (x0+ΔX+ΔX', y0+ΔY+ΔY')], which position has been translated by the second spring constraint processed shift quantity (+ΔX', +ΔY') from the center point having the coordinates (x', y') in the second subregion tR'. The third search region RR" is larger than the third template region TR" and is smaller than the second search region RR'. By way of example, the third search region RR" may have a rectangular shape having a size of 20 pixels (in the vertical direction)×20 pixels (in the horizontal direction). Further, with respect to each of the sets of the third template regions TR", TR", ... and the corresponding third search regions RR", RR", ... (a set of TR"1 and RR"1, a set of TR"2 and RR"2, and so on), the position matching processing means 13 determines a third subregion tR" within the third search region RR", in which third subregion the degree of image pattern coincidence with the corresponding third template region TR" is high. (At this time, as an index representing the degree of image pattern coincidence, for example, the total sum of the absolute values of the differences between pixel values may be employed.) Furthermore, the position matching processing means 13 calculates a third position relationship, which is the corresponding position relationship between the third template region TR" and the third subregion tR". In accordance with the third position relationship, the position matching processing means 13 calculates a third shift quantity (+Δx", +Δy"), which is a translation quantity for causing the third template region TR" to coincide with the third subregion tR". Also, the position matching processing means 13 calculates a shift quantity with respect to each of sets of small regions, which have been set around the third template region TR", and the corresponding small regions, which have been set around the third subregion tR". Further, the position matching processing means 13 performs the spring constraint processing in accordance with the third shift quantity (+Δx", +Δy") and the shift quantities having been calculated with respect to the sets of the small regions. In this manner, the position matching processing means 13 calculates a third spring constraint processed shift quantity (+ΔX", +ΔY").

(4) Thereafter, with respect to the center point of each ROI (one of ROI1, ROI2, . . . ), the position matching processing means 13 calculates an ultimate translation quantity (i.e., an ultimate shift quantity), (+Δxi, +ΔYi) where i=1, 2, . . . [=first spring constraint processed shift quantity+ second spring constraint processed shift quantity+third spring constraint processed shift quantity].

How the spring constraint processing is performed will be described hereinbelow.

As illustrated in FIG. 16, each template ROI (in this case, TR12) is taken as a center region. With respect to the center region and a group of surrounding template ROI's (in this case, eight regions of TR1, TR2, TR3, TR11, TR13, TR23, TR22, and TR21), which surround the center region in a onefold manner, a shift vector (i.e., the shift quantity) of each of the surrounding template ROI's and the shift vector (i.e., the shift quantity) of the template ROI (TR12), which is the center region, are constrained with each other by a virtual spring. In this manner, the shift vectors of the surrounding template ROI's are balanced with one another by constraining forces of the respective springs.

Specifically, the shift vector of the template ROI (TR12), which is the center region, may be represented by (x(2, 2), y(2, 2)). The shift vector of each of the surrounding template ROI's may be represented by (x(2+k, 2+l), y(2+k, 2+l)). Also, a spring constant between the shift vector of the template ROI (TR12), which is the center region, and the shift vector of each of the surrounding template ROI's may be represented by a (k, l). In such cases, by the balance of the spring constraining forces, the shift quantity of the template ROI (TR12), which is the center region, is corrected by Δx(2, 2) in the x direction and by Δy(2, 2) in the y direction. More specifically, a pulling phenomenon in accordance with the differences in shift vector occurs due to the spring constraining forces between the shift vector (x(2, 2), y(2, 2)) of the template ROI (TR12), which is the center region, and the shift vectors (x(2+k, 2+l), y(2+k, 2+l)) of the eight surrounding template ROI's. As a result, the shift vector (x(2, 2), y(2, 2)) of the template ROI (TR12), which is the center region, is corrected by a vector (Δx(2, 2), Δy(2, 2)). The correction quantity (Δx(2, 2), Δy(2, 2)) may be represented by Formulas (1) and (2) shown below.

$$\Delta x(2, 2) = \sum_{k,l}^{8} [a(k, l) \times \{x(2 + k, 2 + l) - x(2, 2)\}] \quad (1)$$

$$\Delta y(2, 2) = \sum_{k,l}^{8} [a(k, l) \times \{y(2 + k, 2 + l) - y(2, 2)\}] \quad (2)$$

Also, a shift vector (nx(2, 2), ny(2, 2)) after being corrected by the correction quantity may be calculated with Formulas (3) and (4) shown below.

$$nx(2,2)=x(2,2)+b\cdot\Delta x(2,2) \quad (3)$$

$$ny(2,2)=y(2,2)+b\cdot\Delta y(2,2) \quad (4)$$

where b represents a fixed number (0<b≦1).

As described above, in cases where the template ROI (TR12) is taken as the center region, the shift vector of the template ROI (TR12) may be corrected by the correction quantity (Δx(2, 2), Δy(2, 2)). As for a shift vector (x(i, j), y(i, j)) of a template ROI (TRij), a correction quantity (Δx(i, j), Δy(i, j)) may be represented by Formulas (5) and (6) shown below.

$$\Delta x(i, j) = \sum_{k,l}^{8} [a(k, l) \times \{x(i + k, j + l) - x(i, j)\}] \quad (5)$$

$$\Delta y(i, j) = \sum_{k,l}^{8} [a(k, l) \times \{y(i + k, j + l) - y(i, j)\}] \quad (6)$$

Also, a shift vector (nx(i, j), ny(i, j)) of each template ROI (TRij) after being corrected by the correction quantity (Δx (i, j), Δy(i, j)) may be calculated with Formulas (7) and (8) shown below.

$$nx(i,j)=x(i,j)+b\cdot\Delta x(i,j) \quad (7)$$

$$ny(i,j)=y(i,j)+b\cdot\Delta y(i,j) \quad (8)$$

A total sum Σa(k, l) of the spring constants a(k, l) of the eight springs with respect to one center region should preferably be normalized to 1.

In the fourth embodiment described above, as the surrounding template ROI's, which constrain one template ROI located at the center region, the eight template ROI's surrounding the center region in a onefold manner are employed. Alternatively, one template ROI located at the center region may be constrained with 24 template ROI's, which contain the eight template ROI's surrounding the center region in a onefold manner and 16 template ROI's located on the side outward from the eight template ROI's. In general, in cases where the number of the constraining template ROI's is represented by Nc, Formulas (5) and (6) shown above may be expressed as Formulas (9) and (10) shown below.

$$\Delta x(i, j) = \sum_{k,l}^{Nc} [a(k, l) \times \{x(i + k, j + l) - x(i, j)\}] \quad (9)$$

$$\Delta y(i, j) = \sum_{k,l}^{Nc} [a(k, l) \times \{y(i + k, j + l) - y(i, j)\}] \quad (10)$$

As described above, the shift vector of each template ROI and the shift vectors of the surrounding template ROI's are pulled by each other with the spring constraining forces and are thereby balanced. In this manner, the shift vector is capable of being smoothed. Therefore, even if problems occur accidentally in that the shift vector of the template ROI is directed to a direction markedly different from the directions of the shift vectors of the surrounding template ROI's or has a shift quantity markedly larger than the shift quantities of the surrounding template ROI's, the adverse effects of the problems are capable of being suppressed.

In the fourth embodiment described above, the spring constraint processing is employed in all of the stages of the staged shift quantity calculation processing. However, the image position matching apparatus in accordance with the present invention is not limited to the fourth embodiment. For example, the spring constraint processing may be employed in one stage or two stages among the stages of the staged shift quantity calculation processing. For example, in cases where the spring constraint processing is performed after the third corresponding position relationship has been calculated (in the third stage), there is the possibility that the position matching accuracy will become low due to smoothing. Therefore, the spring constraint processing may be performed only after the first corresponding position relationship has been calculated (in the first stage) and after the second corresponding position relationship has been calculated (in the second stage). In such cases, by way of example, the region sizes should preferably be set as follows: the size of the first template region is 90 pixels (in the vertical direction)×90 pixels (in the horizontal direction), the size of the first search region is 160 pixels (in the vertical direction)×160 pixels (in the horizontal direction), the size of the second template region is 48 pixels (in the vertical direction)×48 pixels (in the horizontal direction), the size of the second search region is 78 pixels (in the vertical direction)×78 pixels (in the horizontal direction), the size of the third template region is 68 pixels (in the vertical direction)×68 pixels (in the horizontal direction), and the size of the third search region is 76 pixels (in the vertical direction)×76 pixels (in the horizontal direction). Specifically, since a probability that the calculation of the shift quantity will be adversely affected by noise becomes strong if the spring constraint processing is not performed, the size of the template region in the third stage should preferably be set to be larger than the size of the template region in the second stage.

With the conventional techniques proposed in, for example, Japanese Unexamined Patent Publication No. 7(1995)-37074 and U.S. Pat. No. 6,067,373, the warping must be iterated many times due to a low position matching accuracy. With the apparatus for matching positions of images in accordance with the present invention, wherein the spring constraint processing is utilized, the warping may be performed only one time, and the position matching accuracy of the equivalent level or a higher level is capable of being obtained.

In the fourth embodiment described above, as in the second and third embodiments described above, the setting of the template regions and the search regions may be performed with respect to only the regions in the two images P1 and P2, between which regions the degree of shift is high.

Figure 17:
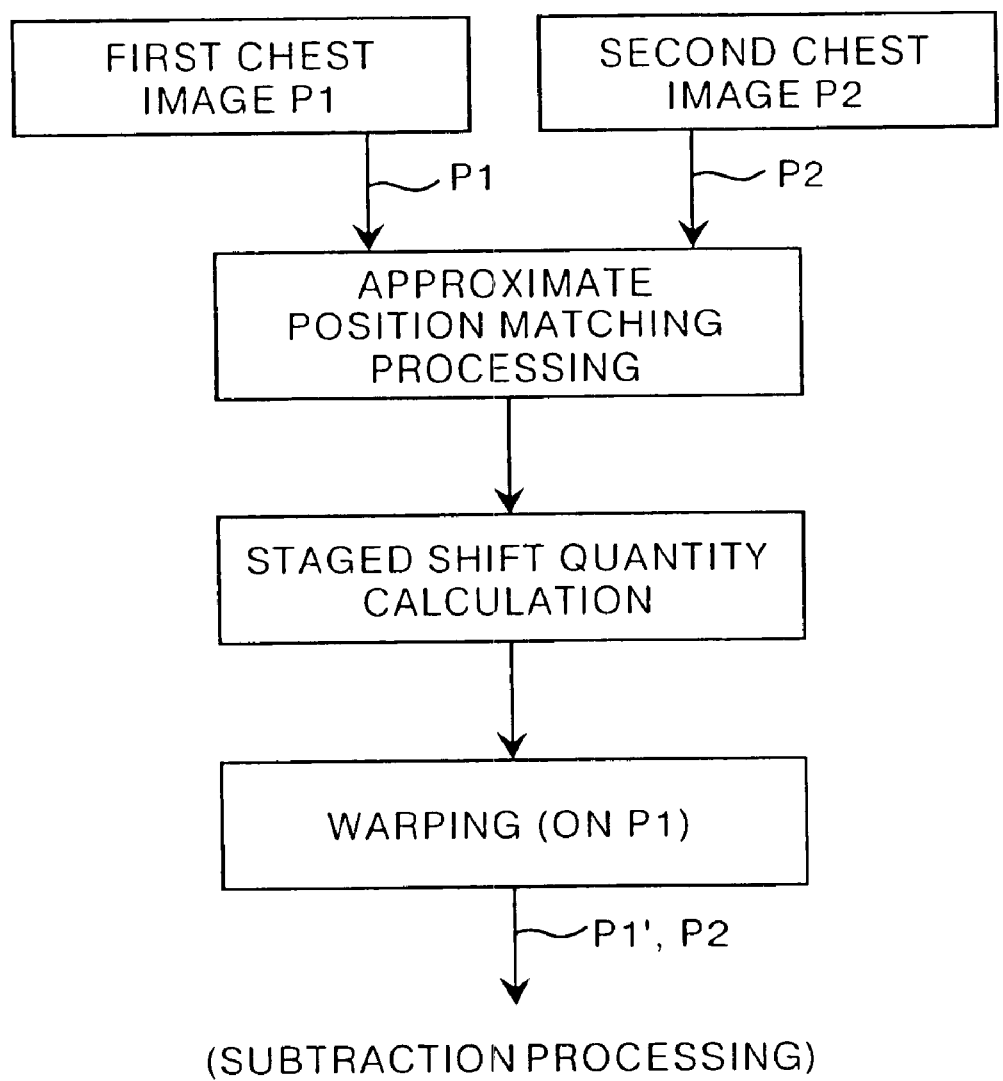
FIG. 17 is a flow chart showing a processing flow in a fifth embodiment of the apparatus for matching positions of images in accordance with the present invention.
Figure 18:
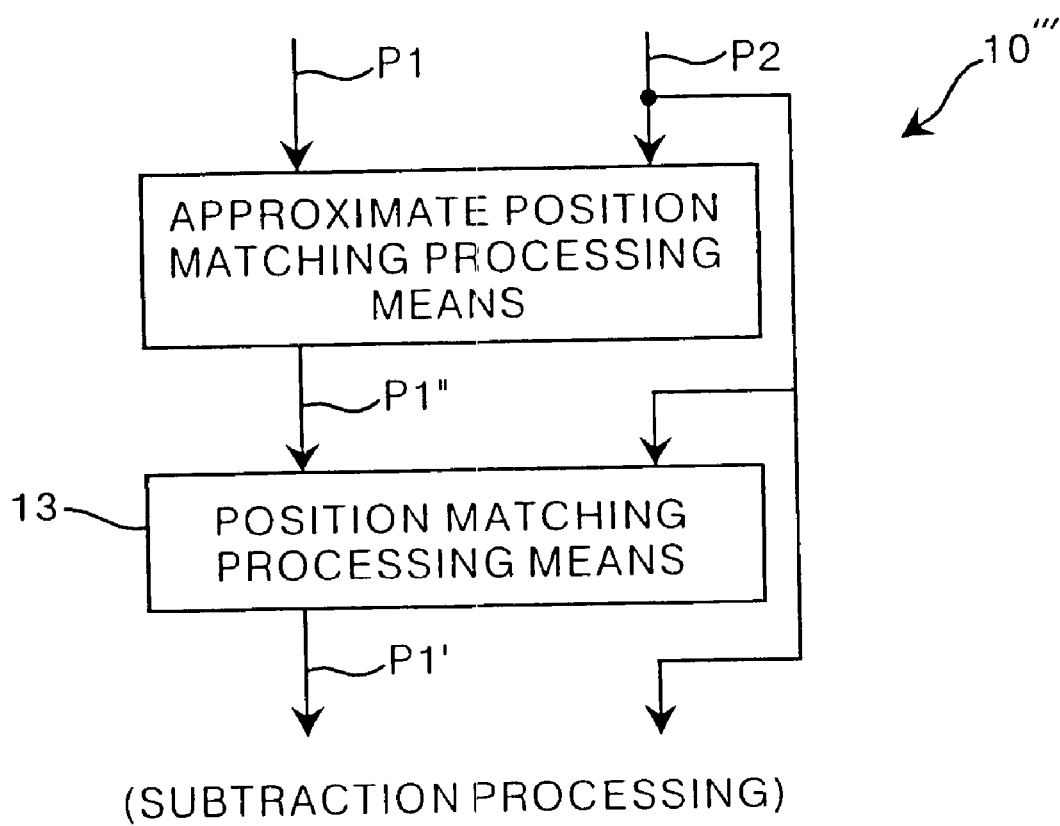
FIG. 18 is a block diagram showing the fifth embodiment of the apparatus for matching positions of images in accordance with the present invention.

FIG. 17 and FIG. 18 show an image position matching apparatus 10''', which is a fifth embodiment of the apparatus for matching positions of images in accordance with the present invention. As in the fifth embodiment, the embodiments described above may be modified such that approximate position matching processing means is utilized at the stage prior the staged shift quantity calculation processing performed by the position matching processing means 13. The approximate position matching processing means performs approximate position matching processing, wherein an affine transform, which comprises rotating processing, parallel translation, and/or image size enlargement or reduction processing, is performed on the entire area of the first image P1, which has been acquired at the point of time earlier than the second image P2, and global position matching processing is thereby performed for matching the positions of the two images P1 and P2 with each other in a global manner.

What is claimed is:

1. A method of matching positions of images, in which positions of two images of a single same object are matched with each other, the method comprising the steps of:

i) setting a plurality of template regions in one of the two images, ii) setting a plurality of search regions in the other image, each of which search regions corresponds to one of the template regions, iii) determining a subregion within each of the search regions, in which subregion a degree of image pattern coincidence with the corresponding template region is high, iv) calculating a corresponding position relationship between each of the template regions and the corresponding subregion, v) iterating operations, in which at least either one of a size of the search region and a size of a search range is reduced in stages, the template region and the search region are set in accordance with the corresponding position relationship having been calculated, and a corresponding position relationship between the template region and the corresponding subregion is calculated successively, an ultimate corresponding position relationship being thereby calculated, and vi) performing transform processing on at least either one of the two images and in accordance with the thus calculated ultimate corresponding position relationship, the positions of the two images being thereby matched with each other.

2. A method as defined in claim 1 wherein, in cases where at least either one of the size of the search region and the size of the search range is reduced in stages, and the template region and the search region are set in accordance with the corresponding position relationship having been calculated, the size of the template region is also reduced in stages.

3. A method as defined in claim 1 or 2 wherein local area limited regions, between which a degree of shift is high, in the two images are set prior to the setting of the template regions and the corresponding search regions, the template regions and the corresponding search regions are set with respect to only the local area limited regions, which have thus been set, and the ultimate corresponding position relationship is calculated.

4. A method as defined in claim 1 or 2 wherein local area limited regions, between which a degree of shift is high, are selected prior to the setting of the template regions and the corresponding search regions by:

setting a plurality of local area limited regions in one of the two images, setting a plurality of local area limited regions, each of which corresponds to one of the local area limited regions in the one image, in the other image, calculating the degree of shift between corresponding local area limited regions in the two images and with respect to each of sets of the corresponding local area limited regions in the two images, and selecting the local area limited regions, between which the degree of shift is high, in the two images in accordance with the thus calculated degrees of shift, the template regions and the corresponding search regions are set with respect to only the local area limited regions, which have thus been selected, and the ultimate corresponding position relationship is calculated.

5. A method as defined in claim 4 wherein the degree of shift between the corresponding local area limited regions is calculated as a total sum value of absolute values of pixel value differences between corresponding pixels in the corresponding local area limited regions in the two images, and the selection of the local area limited regions, between which the degree of shift is high, is made by performing threshold value processing on the total sum value of the absolute values of the pixel value differences between the corresponding pixels in the corresponding local area limited regions.

6. A method as defined in claim 1 or 2 wherein a first corresponding position relationship is calculated by:

setting a first template region in a local area limited region in one of the two images, the setting of the first template region being performed with respect to each of sets of corresponding local area limited regions in the two images, for which local area limited regions the determination of the subregion is to be performed, setting a first search region, which has a size larger than the size of the first template region, in the local area limited region in the other image, the setting of the first search region being performed with respect to each of the sets of the corresponding local area limited regions in the two images, for which local area limited regions the determination of the subregion is to be performed, determining a first subregion within the first search region, in which subregion the degree of image pattern coincidence with the first template region is high, the determination of the first subregion being performed with respect to each of sets of the first template regions and the corresponding first search regions within the corresponding local area limited regions in the two images, and calculating a corresponding position relationship between each of the first template regions and the corresponding first subregion as the first corresponding position relationship, a second corresponding position relationship is calculated by:

setting a second template region, which has a size smaller than the size of the first template region, in the local area limited region in the one image, the setting of the second template region being performed in accordance with the first corresponding position relationship and with respect to each of the sets of the corresponding local area limited regions in the two images, for which local area limited regions the determination of the subregion is to be performed, setting a second search region, which has a size larger than the size of the second template region and smaller than the size of the first search region, in the local area limited region in the other image, the setting of the second search region being performed with respect to each of the sets of the corresponding local area limited regions in the two images, for which local area limited regions the determination of the subregion is to be performed, determining a second subregion within the second search region, in which subregion the degree of image pattern coincidence with the second template region is high, the determination of the second subregion being performed with respect to each of sets of the second template regions and the corresponding second search regions within the corresponding local area limited regions in the two images, and calculating a corresponding position relationship between each of the second template regions and the corresponding second subregion as the second corresponding position relationship, an n-th corresponding position relationship is calculated by iterating the setting of template regions and search regions, the determination of subregions, and the calculation of corresponding position relationships, when necessary, the ultimate corresponding position relationship between each of the template regions and the corresponding subregion being thereby calculated, and the positions of the two images are matched with each other in accordance with the ultimate corresponding position relationship.

7. A method as defined in claim 6 wherein the degree of image pattern coincidence between the first template region and the first subregion is calculated in accordance with a normalized cross correlation value, and the degree of image pattern coincidence between the second template region and the second subregion, and the degree of image pattern coincidence between each of the template regions that follow and each of the corresponding subregions that follow are calculated in accordance with a total sum value of absolute values of pixel value differences between corresponding pixels in the template region and the corresponding subregion in the two images.

8. A method as defined in claim 1 or 2 wherein the two images are time series images, which have been recorded at different points of time.

9. A method as defined in claim 1 or 2 wherein the two images are medical radiation images.

10. An apparatus for matching positions of images, in which positions of two images of a single same object are matched with each other, the apparatus comprising:

position matching processing means for:
setting a plurality of template regions in one of the two images,
setting a plurality of search regions in the other image, each of which search regions corresponds to one of the template regions,
determining a subregion within each of the search regions, in which subregion a degree of image pattern coincidence with the corresponding template region is high,
calculating a corresponding position relationship between each of the template regions and the corresponding subregion,
iterating operations, in which at least either one of a size of the search region and a size of a search range is reduced in stages, the template region and the search region are set in accordance with the corresponding position relationship having been calculated, and a corresponding position relationship between the template region and the corresponding subregion is calculated successively, in order to calculate an ultimate corresponding position relationship, and
performing transform processing on at least either one of the two images and in accordance with the thus calculated ultimate corresponding position relationship in order to match the positions of the two images with each other.

11. An apparatus for matching positions of images, in which positions of two images of a single same object are matched with each other, the apparatus comprising:

i) approximate position matching processing means for performing approximate position matching processing with respect to entire areas of the two images by performing transform processing comprising at least one kind of processing, which is among rotating processing, parallel translation, and image size enlargement or reduction processing, on the entire area of at least either one of the two images, and ii) position matching processing means for:

setting a plurality of template regions in one of the two images, whose positions have been approximately matched with each other by the approximate position matching processing means, setting a plurality of search regions in the other image, each of which search regions corresponds to one of the template regions, determining a subregion within each of the search regions, in which subregion a degree of image pattern coincidence with the corresponding template region is high, calculating a corresponding position relationship between each of the template regions and the corresponding subregion, iterating operations, in which at least either one of a size of the search region and a size of a search range is reduced in stages, the template region and the search region are set in accordance with the corresponding position relationship having been calculated, and a corresponding position relationship between the template region and the corresponding subregion is calculated successively, in order to calculate an ultimate corresponding position relationship, and performing transform processing on at least either one of the two images and in accordance with the thus calculated ultimate corresponding position relationship in order to match the positions of the two images with each other.

12. An apparatus as defined in claim 10 or 11 wherein, in cases where the position matching processing means reduces at least either one of the size of the search region and the size of the search range in stages and sets the template region and the search region in accordance with the corresponding position relationship having been calculated, the position matching processing means also reduces the size of the template region in stages.

13. An apparatus as defined in claim 10 or 11 wherein the apparatus further comprises position matching region setting means for setting local area limited regions, between which a degree of shift is high, in the two images prior to the setting of the template regions and the corresponding search regions, and the position matching processing means sets the template regions and the corresponding search regions with respect to only the local area limited regions, which have been set by the position matching region setting means, and calculates the ultimate corresponding position relationship.

14. An apparatus as defined in claim 10 or 11 wherein the apparatus further comprises position matching region selecting means for selecting local area limited regions, between which a degree of shift is high, prior to the setting of the template regions and the corresponding search regions by:

setting a plurality of local area limited regions in one of the two images, setting a plurality of local area limited regions, each of which corresponds to one of the local area limited regions in the one image, in the other image, calculating the degree of shift between corresponding local area limited regions in the two images and with respect to each of sets of the corresponding local area limited regions in the two images, and selecting the local area limited regions, between which the degree of shift is high, in the two images in accordance with the thus calculated degrees of shift, and the position matching processing means sets the template regions and the corresponding search regions with respect to only the local area limited regions, which have been selected by the position matching region selecting means, and calculates the ultimate corresponding position relationship.

15. An apparatus as defined in claim 14 wherein the position matching region selecting means calculates the degree of shift between the corresponding local area limited regions as a total sum value of absolute values of pixel value differences between corresponding pixels in the corresponding local area limited regions in the two images, and makes the selection of the local area limited regions, between which the degree of shift is high, by performing threshold value processing on the total sum value of the absolute values of the pixel value differences between the corresponding pixels in the corresponding local area limited regions.

16. An apparatus as defined in claim 10 or 11 wherein the position matching processing means comprises spring constraint processing means for performing spring constraint processing in at least one stage among the stages of setting the template region and the search region, the spring constraint processing comprising:

taking every template region in one of the two images and the corresponding subregion in the other image as center regions, taking a plurality of template regions, which surround the center region in the one image, and a plurality of the subregions, which surround the center region in the other image and correspond to the plurality of the template regions, as surrounding regions, constraining the corresponding position relationship, which has been calculated with respect to the corresponding center regions in the two images, and each of the corresponding position relationships, which have been calculated with respect to sets of corresponding surrounding regions in the two images, with each other, the constraint being performed with constraining forces in accordance with the corresponding position relationship, which has been calculated with respect to the corresponding center regions in the two images, and the corresponding position relationships, which have been calculated with respect to the sets of the corresponding surrounding regions in the two images, and calculating a new relative corresponding position relationship with respect to the center regions in accordance with the constraining forces, and the position matching processing means utilizes the new relative corresponding position relationship, which has been calculated by the spring constraint processing means and with respect to each of sets of the center regions in the two images, as the corresponding position relationship between the template region and the corresponding subregion in the at least one stage.

17. An apparatus as defined in claim 10 or 11 wherein the position matching processing means is means for:

calculating a first corresponding position relationship by:

setting a first template region in a local area limited region in one of the two images, the setting of the first template region being performed with respect to each of sets of corresponding local area limited regions in the two images, for which local area limited regions the determination of the subregion is to be performed, setting a first search region, which has a size larger than the size of the first template region, in the local area limited region in the other image, the setting of the first search region being performed with respect to each of the sets of the corresponding local area limited regions in the two images, for which local area limited regions the determination of the subregion is to be performed, determining a first subregion within the first search region, in which subregion the degree of image pattern coincidence with the first template region is high, the determination of the first subregion being performed with respect to each of sets of the first template regions and the corresponding first search regions within the corresponding local area limited regions in the two images, and calculating a corresponding position relationship between each of the first template regions and the corresponding first subregion as the first corresponding position relationship, calculating a second corresponding position relationship by:

setting a second template region, which has a size smaller than the size of the first template region, in the local area limited region in the one image, the setting of the second template region being performed in accordance with the first corresponding position relationship and with respect to each of the sets of the corresponding local area limited regions in the two images, for which local area limited regions the determination of the subregion is to be performed, setting a second search region, which has a size larger than the size of the second template region and smaller than the size of the first search region, in the local area limited region in the other image, the setting of the second search region being performed with respect to each of the sets of the corresponding local area limited regions in the two images, for which local area limited regions the determination of the subregion is to be performed, determining a second subregion within the second search region, in which subregion the degree of image pattern coincidence with the second template region is high, the determination of the second subregion being performed with respect to each of sets of the second template regions and the corresponding second search regions within the corresponding local area limited regions in the two images, and calculating a corresponding position relationship between each of the second template regions and the corresponding second subregion as the second corresponding position relationship, calculating an n-th corresponding position relationship by iterating the setting of template regions and search regions, the determination of subregions, and the calculation of corresponding position relationships, when necessary, in order to calculate the ultimate corresponding position relationship between each of the template regions and the corresponding subregion, and matching the positions of the two images with each other in accordance with the ultimate corresponding position relationship.

18. An apparatus as defined in claim 17 wherein the position matching processing means operates such that the degree of image pattern coincidence between the first template region and the first subregion is calculated in accordance with a normalized cross correlation value, and the degree of image pattern coincidence between the second template region and the second subregion, and the degree of image pattern coincidence between each of the template regions that follow and each of the corresponding subregions that follow are calculated in accordance with a total sum value of absolute values of pixel value differences between corresponding pixels in the template region and the corresponding subregion in the two images.

19. An apparatus as defined in claim 10 or 11 wherein the two images are time series images, which have been recorded at different points of time.

20. An apparatus as defined in claim 10 or 11 wherein the two images are medical radiation images.

* * * * *